(12) United States Patent
Nakamura et al.

(10) Patent No.: US 7,708,517 B2
(45) Date of Patent: May 4, 2010

(54) WORKPIECE TRANSFER METHOD, WORKPIECE TRANSFER SYSTEM AND WORKPIECE TRANSFER DEVICE

(75) Inventors: Setsuo Nakamura, Sagamihara (JP); Shouji Nishimaki, Atsugi (JP); Kenji Masumo, Atsugi (JP); Yoshiharu Honda, Zama (JP); Masayoshi Naito, Zama (JP); Yuta Motohashi, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 289 days.

(21) Appl. No.: 11/601,713

(22) Filed: Nov. 20, 2006

(65) Prior Publication Data
US 2007/0116550 A1 May 24, 2007

(30) Foreign Application Priority Data
Nov. 21, 2005 (JP) ............................. 2005-335317
Feb. 27, 2006 (JP) ............................. 2006-050990
Aug. 8, 2006 (JP) ............................. 2006-215567

(51) Int. Cl.
*B65G 47/90* (2006.01)
*B65G 47/252* (2006.01)
*G06F 19/00* (2006.01)

(52) U.S. Cl. .................. 414/816; 414/416.08; 414/782; 414/783; 414/730; 901/45; 901/2; 700/192; 700/114

(58) Field of Classification Search ................. 206/448, 206/449, 454; 211/41.1, 41.14; 294/907; 410/143, 155, 31, 32, 33, 43, 46, 69, 80; 414/274–275, 416.08, 730, 736–737, 781–783, 414/936; 901/35, 45; 700/114, 192
See application file for complete search history.

(56) References Cited

U.S. PATENT DOCUMENTS

| | | | | |
|---|---|---|---|---|
| 4,433,382 | A | * | 2/1984 | Cunningham et al. ........ 700/192 |
| 4,561,176 | A | * | 12/1985 | Leddet ......................... 29/709 |
| 4,773,523 | A | * | 9/1988 | Hansen et al. .............. 414/799 |
| 4,778,329 | A | * | 10/1988 | Phillips ....................... 414/589 |
| 4,852,237 | A | * | 8/1989 | Tradt et al. ............... 29/407.05 |
| 4,885,833 | A | * | 12/1989 | Umegai et al. ........... 29/407.05 |
| 4,899,891 | A | * | 2/1990 | Sipila et al. .............. 211/41.14 |

(Continued)

FOREIGN PATENT DOCUMENTS
EP 601425 A1 * 6/1994

(Continued)

*Primary Examiner*—Gregory W Adams
(74) *Attorney, Agent, or Firm*—Global IP Counselors, LLP

(57) ABSTRACT

A workpiece transfer system or method is provided for transferring workpieces one set of pallets to another set of pallets using a workpiece transfer device that is movably attached to a robot. The workpiece transfer device uses mechanical devices to align the workpiece relative to the robot so that different types of workpieces can be placed into a pallet without the need of troublesome, expensive and complex image processing in which the workpiece holding positions are processed as images by using an imaging device such as a visual sensor. Preferably, the workpiece transfer device cooperates with a positional adjustment part such that the workpiece that is held by the transfer device contacts the the positional adjustment part to position the workpiece in a depthwise direction of the workpiece, a widthwise direction of the workpiece and a longitudinal direction of the workpiece.

8 Claims, 27 Drawing Sheets

U.S. PATENT DOCUMENTS

| | | | | |
|---|---|---|---|---|
| 4,976,344 A | * | 12/1990 | Hultberg | 198/418.2 |
| 5,610,102 A | * | 3/1997 | Gardopee et al. | 438/5 |
| 5,632,590 A | * | 5/1997 | Pearson et al. | 414/404 |
| 5,632,595 A | | 5/1997 | Mori et al. | |
| 6,785,584 B2 | * | 8/2004 | Yoshikawa | 700/114 |
| 6,876,897 B2 | * | 4/2005 | Gillen et al. | 700/114 |
| 2003/0113192 A1 | | 6/2003 | Ransom | |
| 2004/0162625 A1 | * | 8/2004 | Herrmann et al. | 700/61 |

FOREIGN PATENT DOCUMENTS

| | | | |
|---|---|---|---|
| FR | 2676425 A1 | * | 11/1992 |
| JP | 2000-293695 | | 10/2000 |
| JP | 2000-327108 | | 11/2000 |

* cited by examiner

WORKPIECE TRANSFER METHOD, WORKPIECE TRANSFER SYSTEM AND WORKPIECE TRANSFER DEVICE

CROSS-REFERENCE TO RELATED APPLICATIONS

This application claims priority under 35 U.S.C. §119 to Japanese Patent Application Nos. 2005-335317, filed Nov. 21, 2005, 2006-050990, filed Feb. 27, 2006 and 2006-215567, filed Aug. 8, 2006. The entire disclosures of Japanese Patent Application Nos. 2005-335317, 2006-050990 and 2006-215567 are hereby incorporated herein by reference.

BACKGROUND OF THE INVENTION

1. Field of the Invention

The present invention generally relates to a workpiece transfer method, a workpiece transfer system, and a workpiece transfer device. More specifically, the present invention relates to a workpiece transfer system in which workpieces are transferred from one set of pallets to another set of pallets.

2. Background Information

Often in automated production lines, a robotically operated transfer device is used to automatically remove (pickup) individual workpieces that have been stacked on a pallet and then transferred to another location or pallet. An example of such a robotically operated device is disclosed in Japanese Laid Open Patent Publication No. 2000-293695. In this publication, the transfer device has a visual sensing or imaging device that is attached to an end of a robot wrist. This imaging device captures images and based on the images captured by this imaging device, the three-dimensional positions of the individual workpieces are determined. Thus, the workpieces can be handled by feedback of the position detection data to the robot.

In view of the above, it will be apparent to those skilled in the art from this disclosure that there exists a need for an improved workpiece transfer system or method in which workpieces are transferred from one set of pallets to another set of pallets. This invention addresses this need in the art as well as other needs, which will become apparent to those skilled in the art from this disclosure.

SUMMARY OF THE INVENTION

It has been discovered that certain there are some disadvantages with the system described in the above mentioned publication in which the positions of the workpieces are determined using a visual sensor or imaging device. Not only are visual sensors costly, but the visual sensors do not respond well to changes in environment such as brightness in the detection area (changes resulting from variation in brightness). Thus, there are times when the correct positions of the workpieces are not properly detected by the visual sensor or imaging device.

In addition, with this type of device, the image data for the workpiece positions captured by the imaging device are subjected to processing to convert the image data to position data. When a malfunction occurs, a high-level of specialized skill in adjusting the robot and the imaging device interface is required, which is a disadvantage from the standpoint of maintenance.

An object of the invention is thus to provide an inexpensive and low-maintenance workpiece transfer method and workpiece transfer device whereby it is possible to move glass from one pallet to another pallet without using visual sensors, while still providing high-precision positioning using a mechanical devices.

In order to achieve the above mentioned object, a workpiece transfer method or system in accordance with a first aspect of the present invention basically comprises: providing a first pallet containing a workpiece at a first location adjacent to a robot having a transfer device that is movably attached to the robot to pick up the workpiece; transporting the workpiece from the first pallet using the transfer device to a positional adjustment part in response to pre-programmed operations of the robot; and performing a workpiece alignment operation to align a workpiece holding position of the workpiece relative to the robot by subsequently moving the transfer device that is holding the workpiece as a result of the pre-programmed operations of the robot towards the positional adjustment part such that the workpiece contacts the positional adjustment part to move the workpiece with respect to the robot and to align the workpiece holding position in which the workpiece is held by the transfer device with a reference holding position of the robot.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
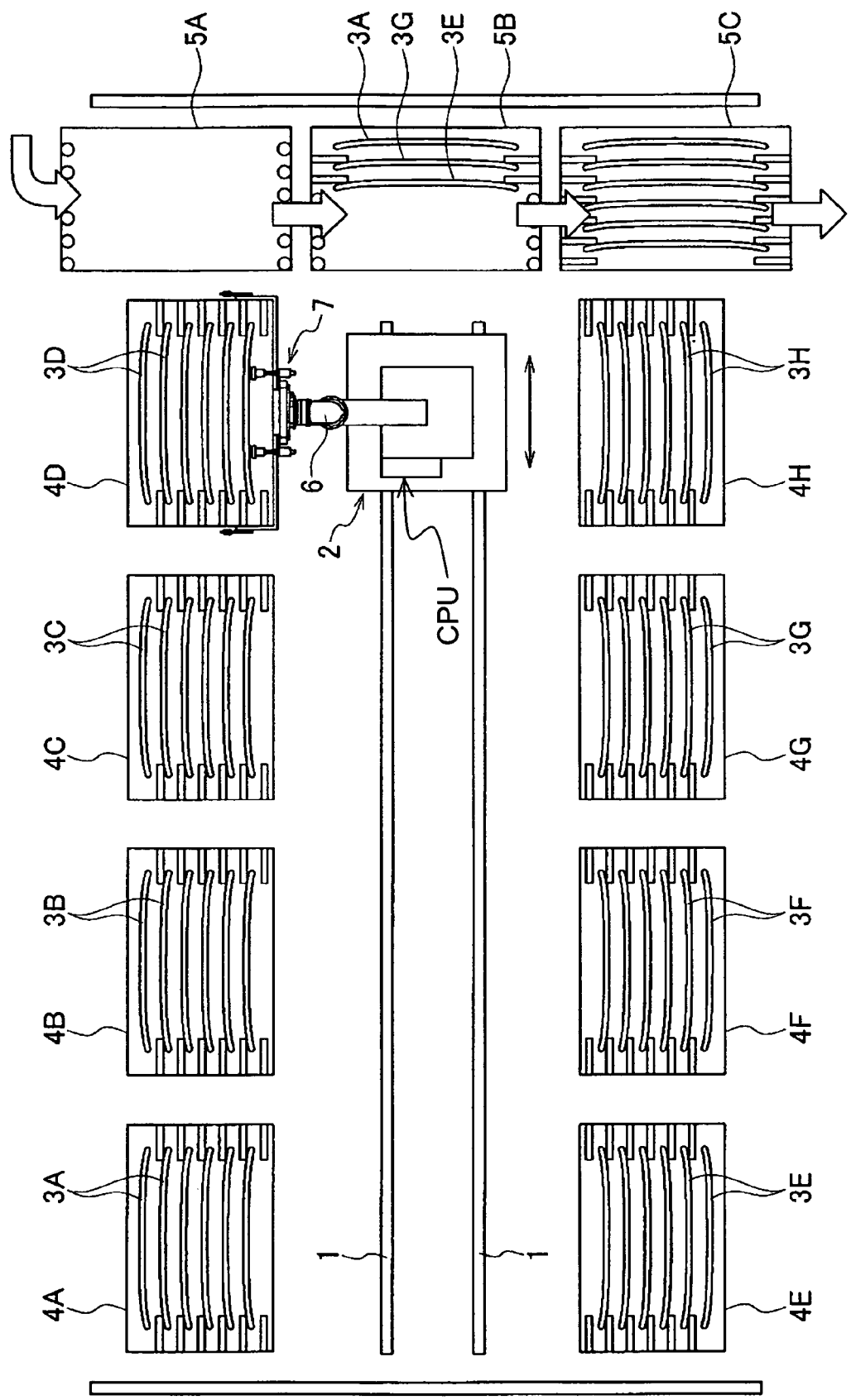
FIG. 1 is a simplified schematic layout diagram of a glass transfer system for transferring glass plates from a first pallet to a second pallet using a glass transfer device attached to a robot in accordance with one embodiment of the present invention.

Referring initially to FIG. 1, a glass or workpiece transfer system schematically is illustrated in accordance with a first embodiment of the present invention. The glass transfer system of this embodiment, as shown in FIG. 1, includes a handling robot 2 which is a robot that moves on a pair of rails 1 disposed over a work floor. The glass transfer system is configured and arranged for transferring a plurality of glass plates or workpieces 3 from a set of first pallets 4 to a set of second pallets using a glass or workpiece transfer device 7 attached to the robot 2. The first pallets 4 (4A to 4H) are configures and arranged at first location to allow the glass plates 3 (3A to 3H) to be placed at a prescribed spacing along the direction of travel of the handling robot 2. The second pallets 5 (5A to 5C) onto which the glass plates 3 from the first pallets 4 are transferred and placed in sequence, and a glass transfer device 7 attached to the wrist part 6 of a handling robot 2. With the aid of the glass transfer device 7, the specified glass plates 3 are taken out from the first pallets 4, the glass holding position in which a glass plate 3 is held is then aligned with respect to the reference holding position of the handling robot 2, and the glass plate 3 is transferred to one of the second pallet 5.

Figure 2:
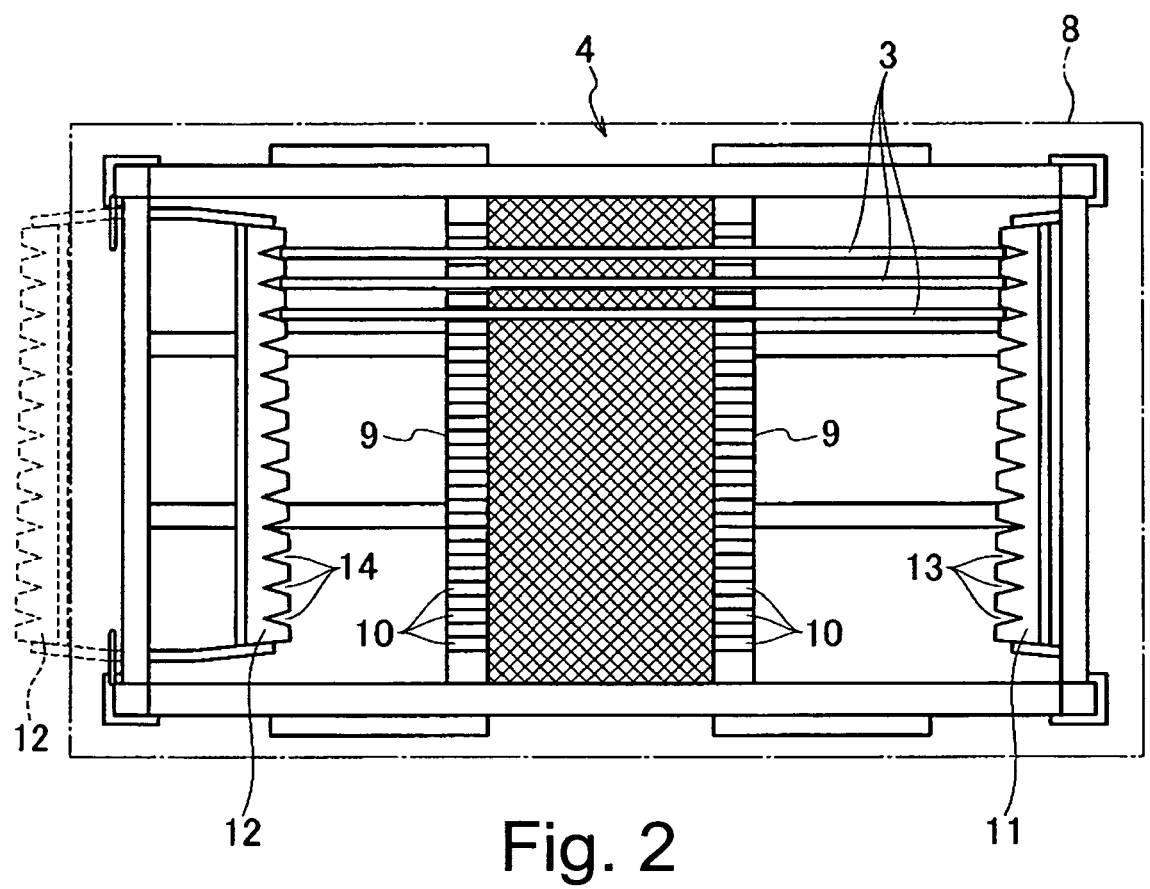
FIG. 2 is a simplified top plan view of one of the first pallets used in the glass transfer system of FIG. 1 in accordance with the illustrated embodiment of the present invention.
Figure 3:
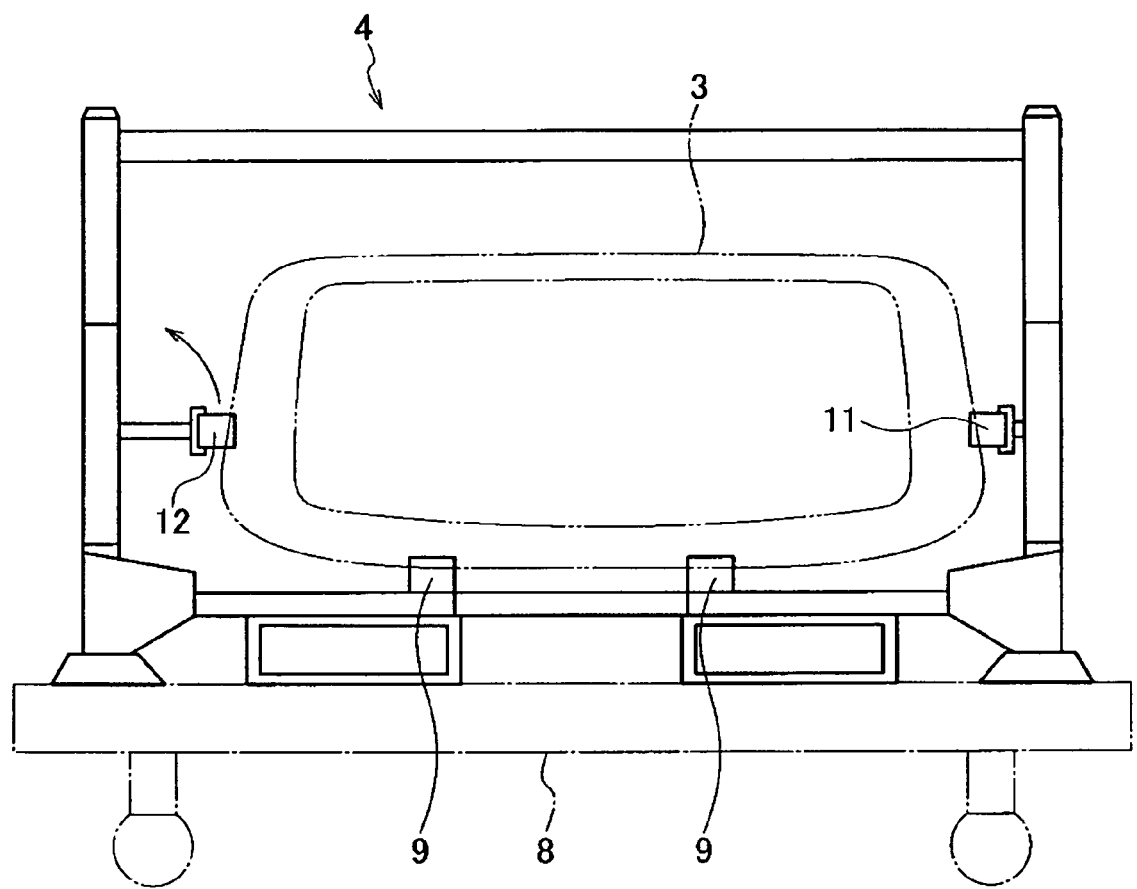
FIG. 3 is a simplified front elevational view of one of the first pallets used in the glass transfer system of FIG. 1 in accordance with the illustrated embodiment of the present invention.

The first pallets 4 are specialty pallets for transporting the glass plates 3 from glass manufacturers that produce the glass plates 3 to vehicle production plants where vehicles are assembled using the glass plates 3. As shown in FIGS. 2 and 3, the pallets 4 are each placed on a dolly 8 to be moved to a prescribed location on the production plant floor. In this embodiment, several of the pallets 4 are placed at prescribed locations that are spaced along the route of travel (robot transport path) of the handling robot 2 that moves along the rails 1. In particular, the pallets 4 are placed on both sides of this robot transport path of the handling robot 2. In the illustrated example of FIG. 1, four of the first pallets 4 are located on each side of the robot transport path, and thus a total of eight of the first pallets 4 are located on along the robot transport path of the handling robot 2.

The glass plates 3 are placed at a prescribed spacing on each of the first pallets 4. Each of the first pallets 4 (4A-4H) has a different type of the glass plates 3 in accordance with the vehicle type or model. However, within each of the first pallets 4, the glass plates 3 are all of the same type of glass plates. For example, the first pallet 4A has a plurality of glass plates 3A for vehicle type A, while the first pallet 4B has a plurality of glass plates 3B for vehicle type B.

The first pallets 4 each have a pair of glass (workpiece) placement/holding members 9 provided at the bottom of the pallets 4, which are used for controlling the placement of the glass plates 3 at a prescribed spacing on the pallets 4. The glass placement/holding members 9 have a plurality of glass placement grooves 10 used to hold the glass plates 3 at a prescribed spacing. In addition, the first pallets 4 each includes a pair of glass support members 11 and 12. The glass support members 11 and 12 are provided on each transverse side of the glass plates 3 so that the glass plates 3 are held in an upright state in the glass placement grooves 10. The glass support members 11 and 12 have one end fixed with respect to a support column of the pallet 4 that serves as a structural framework, and another end that is free to move. In this embodiment, the glass supports 12 on the left side of FIGS. 2 and 3 are configured so that they can move between a position in which the glass plates 3 are supported (position indicated by the solid line) and a position in which the supports 12 are located outside the support column so that the glass plates 3 are not supported (position indicated by the broken line). In addition, the glass support members 11 and 12 are provided with glass support grooves 13 and 14 for supporting each of the glass plates 3 at a prescribed spacing. Regarding the first pallets 4, each of the first pallets 4A to 4H are not precisely identical due to various non-uniformities in assembly precision or part precision. Thus, the first pallets 4A to 4H are non-uniformly manufactured such that the first pallets 4A to 4H have non-uniformities relating to their size or dimensions of each part occur among the pallets 4A to 4H.

The second pallets 5 are so-called production-line pallets for sequential arrangement of the glass plates 3 that have been taken out from the first pallets 4 by the glass transfer device 7. In particular, the glass plates 3A to 3H are taken out of the first pallets 4A to 4H and placed on at a prescribed spacing from the rear to front on corresponding ones of the second pallets 5 in accordance with a prescribed vehicle assembly production sequence such that each of the second pallets 5 has a plurality of the glass plates 3 with the type of glass plates being arranged in a particular sequence on the second pallets 5. For example, when the vehicle production sequence is to occur in the sequence "vehicle type D, vehicle type E, vehicle type G, vehicle type A," then the glass plates 3A, 3G, 3E, and 3D from the A dolly, the G dolly, the E dolly, and the D dolly are placed in this sequence on the second pallet 5 so that they are ordered from the front to the back of the pallets 5 in the vehicle production sequence.

As seen in FIG. 1, the second pallets 5 are provided at the glass transfer position on the right side along an extension of the robot transport path described above. The second pallets 5 move along a pallet transport path having its pallet intake position located at the top of FIG. 1, and its pallet discharge position located at the bottom of FIG. 1. Thus, the pallet transport path of the second pallets 5 runs in sequence from top to bottom in FIG. 1.

As with the first pallets 4, as seen in FIGS. 4(A), 4(B), 4(C) and 5, the second pallets 5 have a pair of glass placement/support members 15 for supporting a lower edge of the glass plates 3. Thus, the glass placement/support members 15 serve as framework structures that are provided at the bottom of the pallets 5 in order to control the placement of the glass plates 3 at a prescribed spacing. The glass placement/support members 15 are provided with a plurality of glass placement grooves 16. The glass placement grooves 16 are formed in the glass placement/support members 15 at a prescribed spacing so that the glass plates 3 are placed at the prescribed spacing. The second pallets 5 each have a plurality of glass partitioning plates 17 for supporting the glass plates 3 in an upright condition. These glass partitioning plates 17 are pivotally supported on support columns 18 of the pallets 5 that serve as frame structures of the pallets 5. Thus, the glass partitioning plates 17 are provided on each side in the widthwise direction of the glass plates 3 in order to support the glass plates 3 in a state in which the glass plates 3 are placed upright in the glass placement grooves 16 (upright condition), and in order to separate each of the glass plates 3.

Figure 4A:
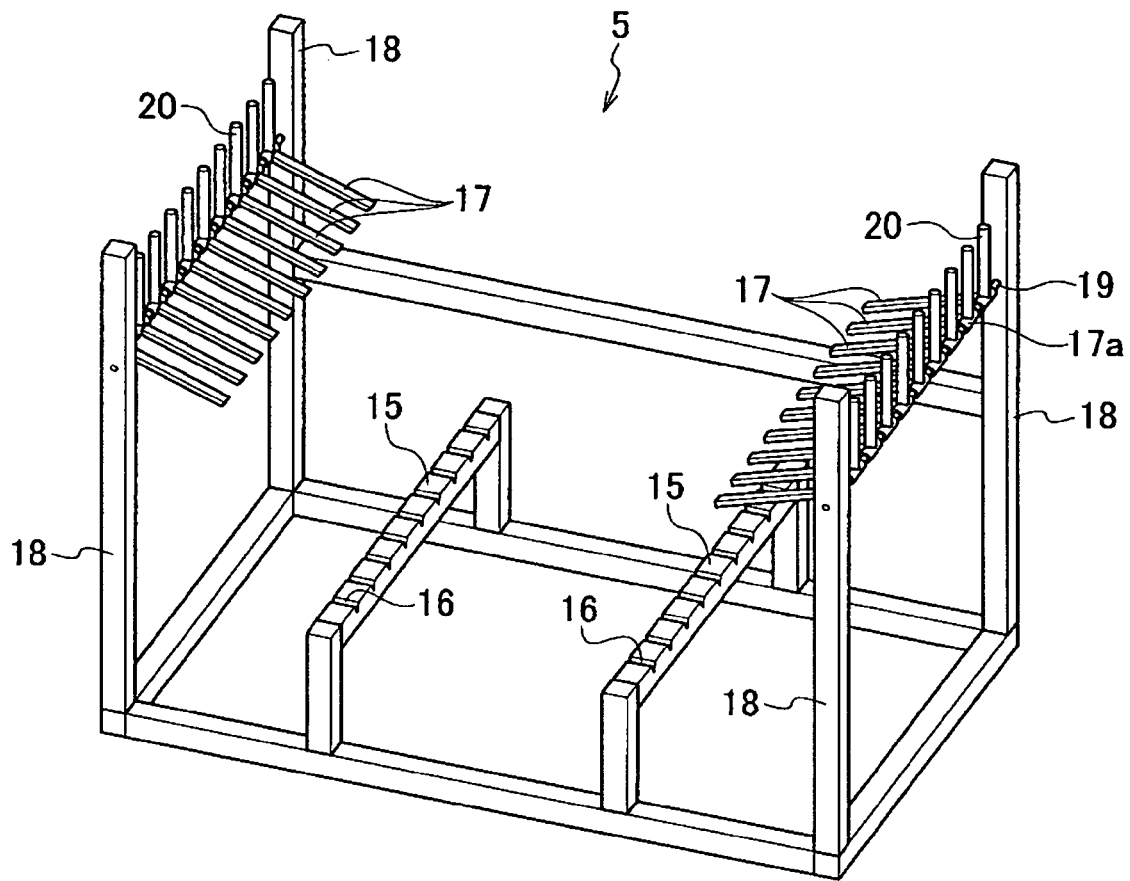
FIG. 4(B) is a simplified front elevational view of one side of the second pallet illustrated in FIG. 4(A) and showing the glass partitioning plates in the condition before the glass plates have been lowered.
FIG. 4(C) is a simplified front elevational view of one side of the second pallet illustrated in FIG. 4(A) and showing the glass partitioning plates in the condition after the glass plates have been lowered.
Figure 4B:
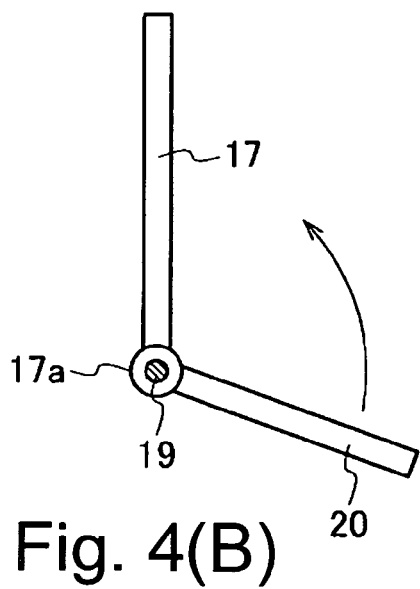
Figure 4C:
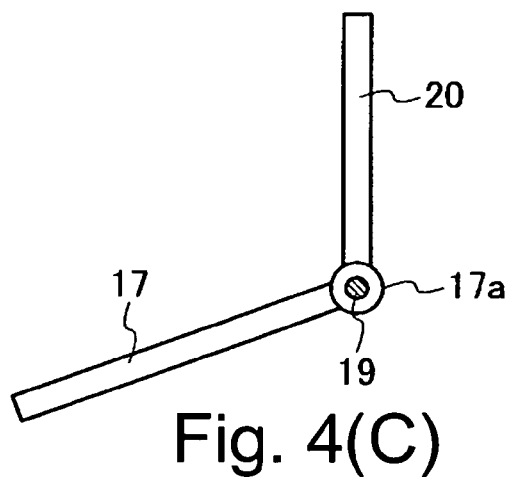
Figure 5:
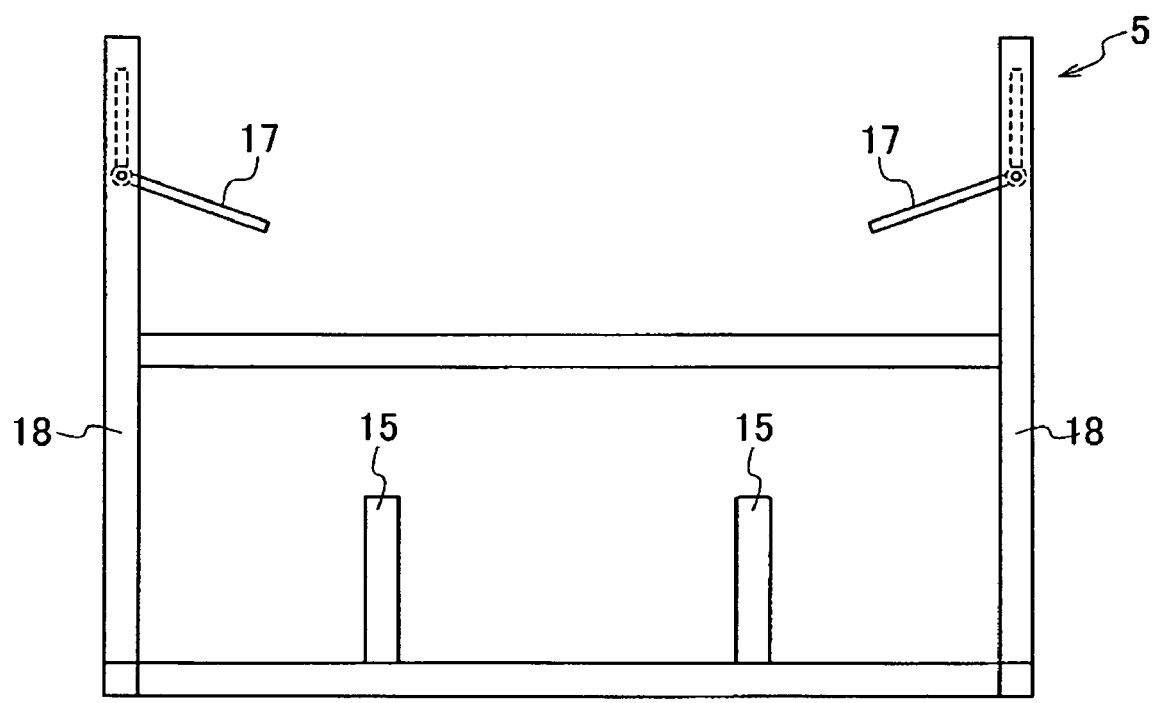
FIG. 5 is a simplified front elevational view of one the second pallets used in the glass transfer system of FIG. 1 in accordance with the illustrated embodiment of the present invention.

As seen in FIGS. 4(B) and 4(C), these glass partitioning plates 17 are arranged so that these glass partitioning plates 17 can rotate with respect to a support axis 19 that is fixed between the support columns 18 of the pallets 5. After placement of glass plates 3 by the glass transport device 7, described below, the partitioning plates 17 are lowered by the glass transfer device 7 so that the glass plates 3 are separated from each other. The glass partitioning plates 17 are disposed in the axial direction of the support shaft 19 in accordance with the number of glass plates 3, and the base ends 17a are attached so that they can rotate around this support shaft 19. A pop-up rod 20 is provided on each of the glass partitioning plates 17. The pop-up rods 20 are configured and arranged to pop up by the glass transfer device 7 as explained below. The pop-up rods 20 are fixed at an angle of approximately 90° with respect to the glass partitioning plates 17 at the base ends 17a. FIG. 4(B) shows the condition prior to pop-up of the pop-up rods 20 with the glass partitioning plates 17 arranged vertically. FIG. 4(C) shows the condition in which the pop-up rods 20 have popped up and the glass partitioning plates 17 have moved down into a position to separate the glass plates 3 from each other.

The condition of the glass partitioning plates 17 before and after pop-up is held (locked) by a rotational holding mechanism (not shown in the figures) provided between the base end 17a and the support shaft 19. Easy transition from one condition to the other is possible as a result of an urging force of the rotational holding mechanism. Various conventional well-known mechanisms can be used for this rotational holding mechanism. The respective glass partitioning plates 17, prior to placement of the glass plates 3 from the first pallets 4, are all in the state shown in FIG. 4(B) in which they are held vertically. After placement of the glass plates 3 on the second pallets 5, the glass plates 3 are separated as a result of the popped-up state shown in FIG. 4(C).

Figure 6:
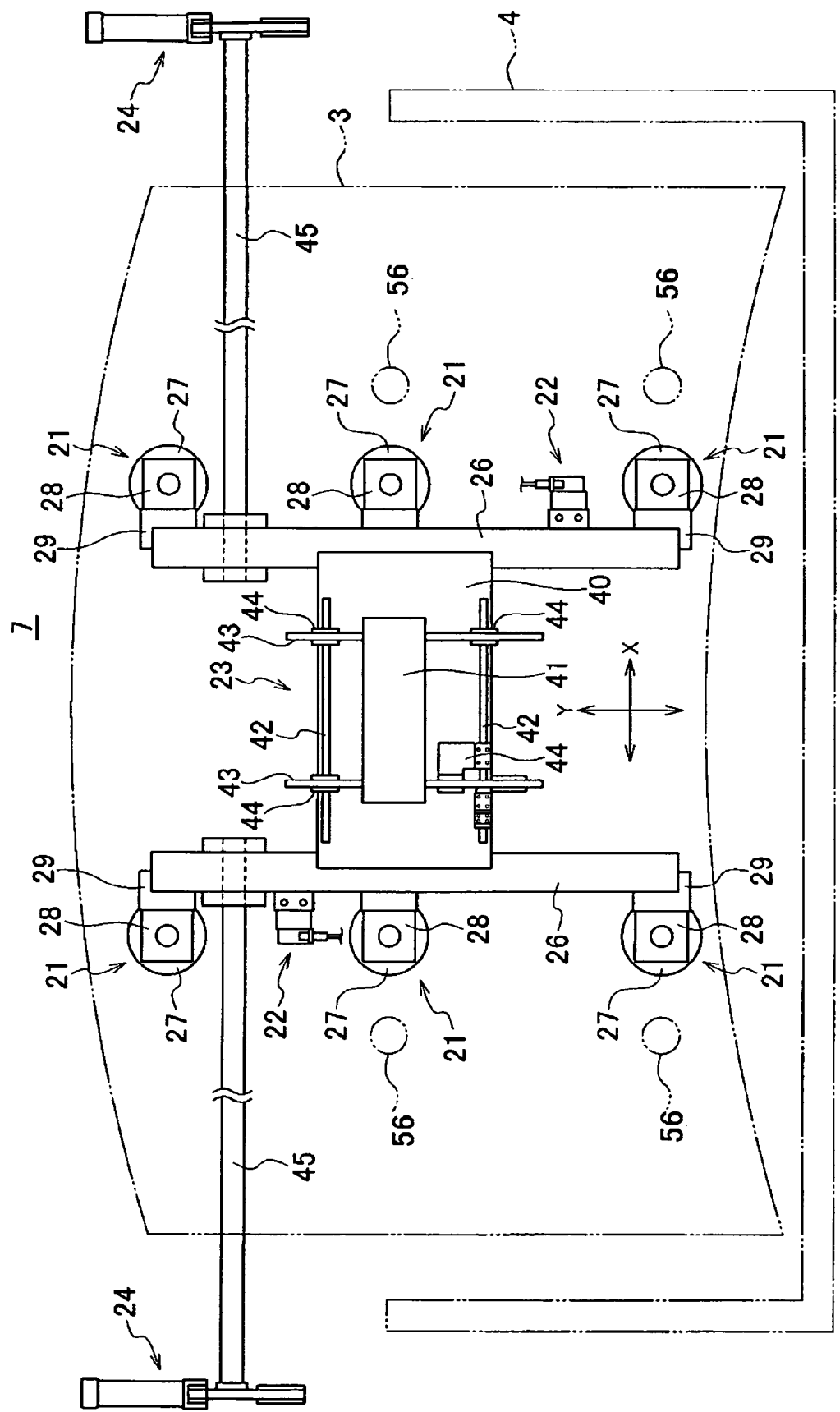
FIG. 6 is a simplified front elevational view of one the glass transfer device used in the glass transfer system of FIG. 1 in accordance with the illustrated embodiment of the present invention.
Figure 7:
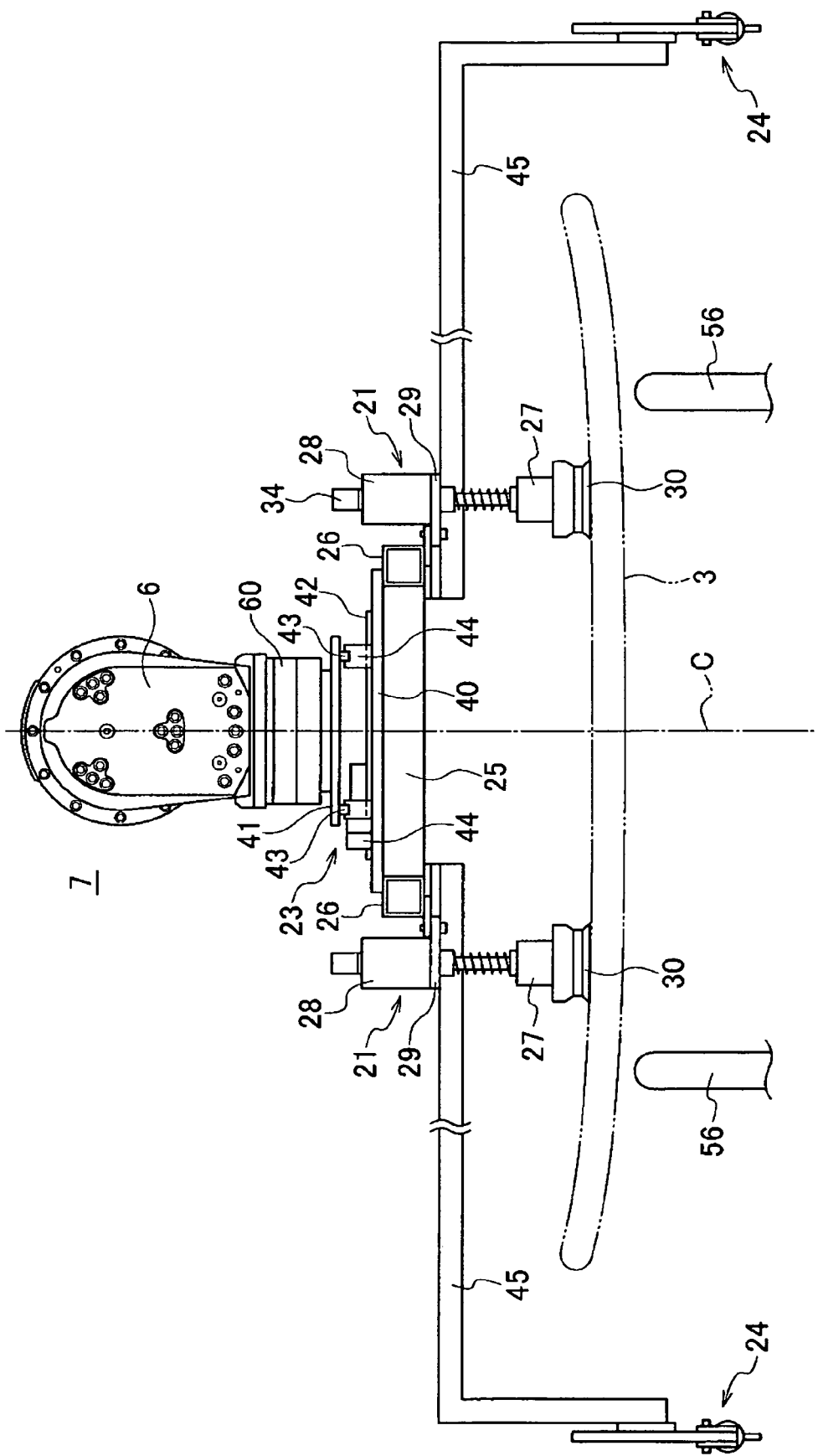
FIG. 7 is a simplified top plan view of the glass transfer device illustrated in FIG. 6 that is used in the glass transfer system of FIG. 1 in accordance with the illustrated embodiment of the present invention.
Figure 8:
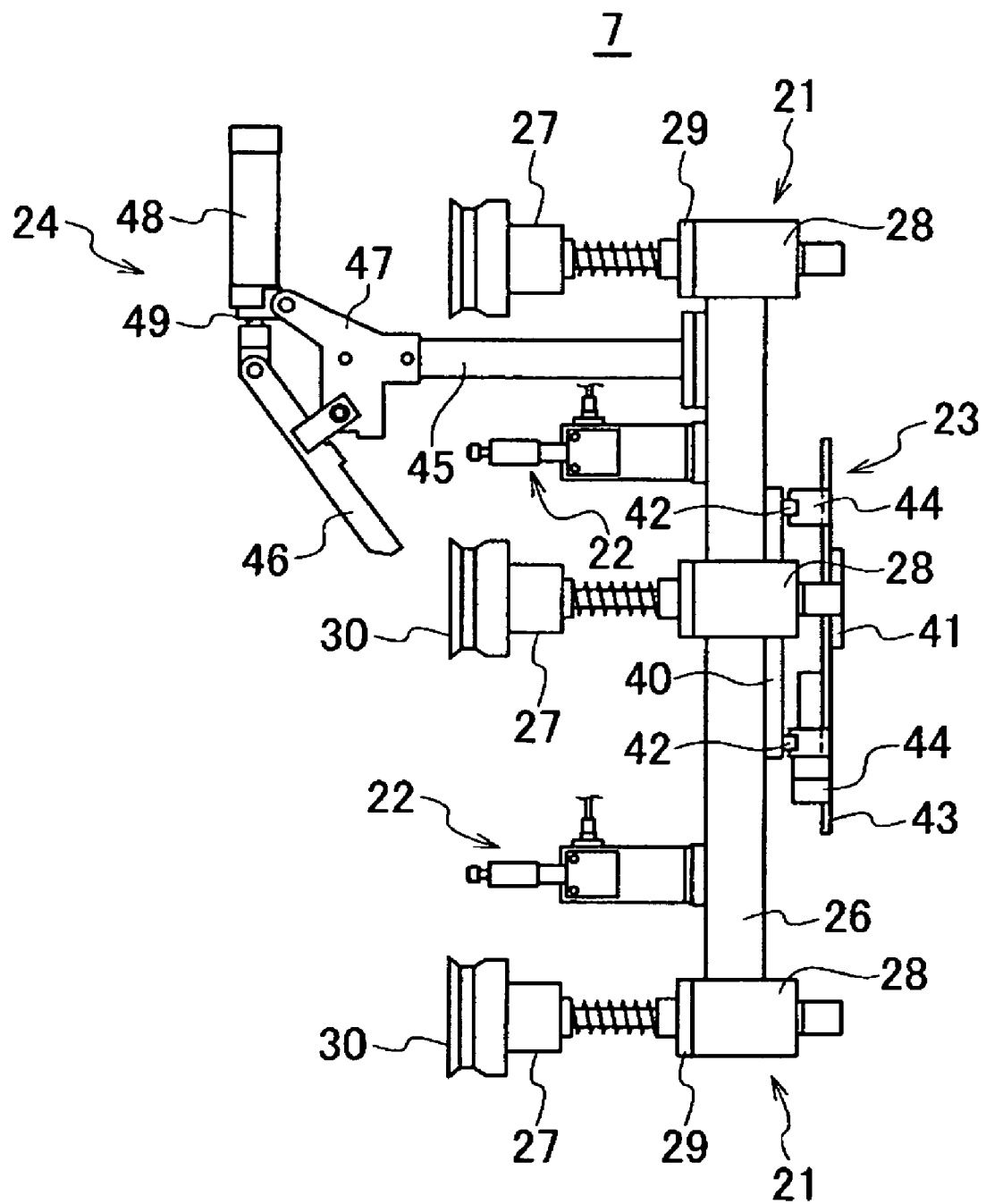
FIG. 8 is a simplified side elevational view of the glass transfer device illustrated in FIG. 6 that is used in the glass transfer system of FIG. 1 in accordance with the illustrated embodiment of the present invention.

As shown in FIGS. 6 to 8, the glass transfer device 7 basically includes, among other things, a plurality of vacuum-chuck position adjustment units 21, a pair of glass detection units 22, a glass holding position adjustment unit 23 and a pair of partitioning plate lowering units 24. This glass transfer device 7 is a device that repeats a sequential series of operations in which specified ones of the glass plates 3 from among the glass plates 3A to 3H (sorted according to different types on the first pallets 4A to 4H) are taken out from prescribed ones of the first pallets 4 in accordance with the vehicle assembly production sequence. Thus, the glass plates 3 are transferred to one of the second pallets 5 in accordance with this assembly production sequence. The glass plates 3 are attached to the wrist part 6 of the handling robot 2. The glass plate transfer device 7 is attached to the wrist part 6 at the end of the wrist of a handling robot 2 that moves back and forth on rails 1. The glass plate transfer device 7 is configured so that the prescribed glass plates 3A to 3H are taken out from respective first pallets 4A to 4H by movement of the handling robot 2 in accordance with the production sequence. After correction of the glass plate holding position by the function of the glass plate transfer device 7 to adjust a glass holding position, the glass plate is placed one of the second pallet 5.

The glass transfer device 7 has a hand frame 25 is attached to the wrist part 6 of the handling robot 2. The hand frame 25 includes a pair of attachment arms 26 with three of the vacuum-chuck position adjustment units 21 mounted onto each of the attachment arms 26. In particular, the vacuum-chuck position adjustment units 21 are respectively attached to brackets 29 that are fixed to each of the attachment arms 26. The vacuum-chuck position adjustment units 21 each have a vacuum-chuck device 27 that holds the glass plates 3 by vacuum, and a depthwise position adjustment unit 28 that align the glass plate holding position in the depthwise direction of the glass plates 3 with respect to the reference holding position of the handling robot 2. The vacuum-chuck device 27 form a holding mechanism that is configured and arranged to hold the workpiece (the glass plate 3) so as to be transferred from the first pallet 4 to the second pallet 5. The depthwise position adjustment unit 28 forms a part of a workpiece position adjustment mechanism that is configured and arranged to movably attach the holding mechanism (the vacuum-chuck device 27) to the wrist part 6 of the handling robot 2 such that a workpiece holding position in which the workpiece is held by the holding mechanism is adjustable with respect to the robot 2 in the depthwise direction of the workpiece.

The glass detection units 22 are configured and arranged to detect the presence of the glass plate 3 being held by the vacuum-chuck position adjustment units 21. The glass holding position adjustment unit 23 are configured and arranged to align the glass holding position in both transverse and longitudinal directions of the glass plates 3 that are held by the vacuum-chuck position adjustment units 21 with respect to a reference holding position of the handling robot 2. The partitioning plate lowering unit 24 are configured and arranged to engage to the pop-up rods 20 for lowering the glass partitioning plates 17.

Figure 9A:
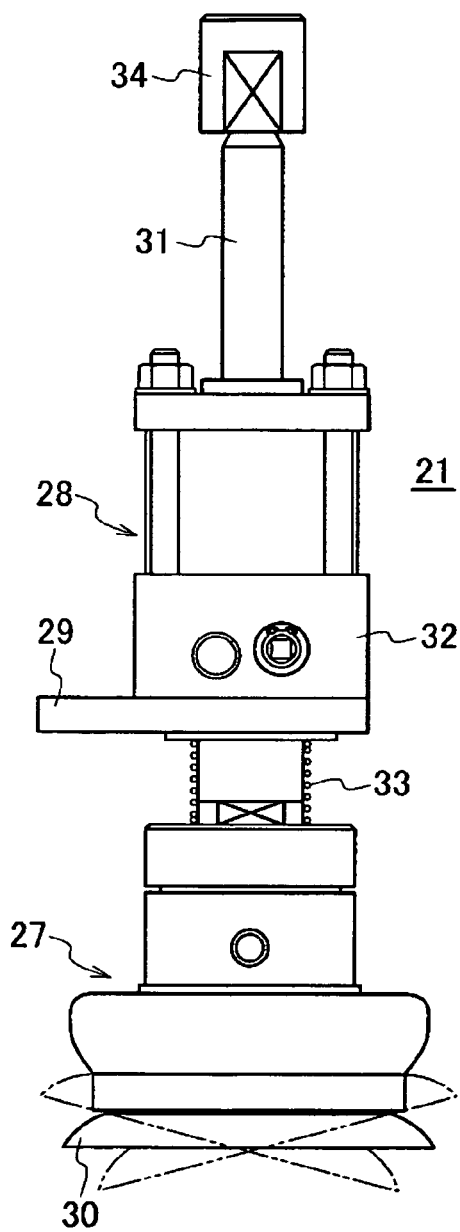
FIG. 9(A) is a simplified elevational view of one of the vacuum-chuck position adjustment units used in the glass transfer system of FIG. 1 in accordance with the illustrated embodiment of the present invention, with the vacuum-chuck position adjustment unit in a first operating position.
Figure 9B:
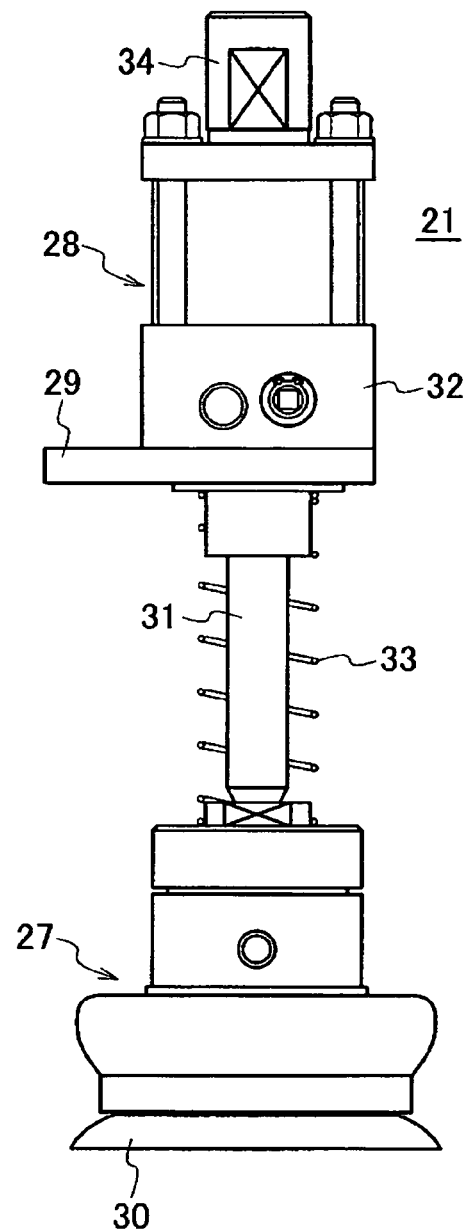
FIG. 9(B) is a simplified elevational view of one of the vacuum-chuck position adjustment units used in the glass transfer system of FIG. 1 in accordance with the illustrated embodiment of the present invention, with the vacuum-chuck position adjustment unit in a second operating position.

The vacuum-chuck device 27, as shown in FIGS. 9(A) and 9(B), has a vacuum-chuck pad 30 that that holds the glass plates 3 by vacuum. The vacuum-chuck pads 30 are pivotally mounted whereby the vacuum-chuck pads 30 can pivot to follow the curvature of the glass plates 3. The vacuum-chuck pads 30 are configured so that they operate as a result of the introduction and evacuation of compressed air that is fed from an evacuation/pressurization line not shown in the figures. When compressed air is introduced, the vacuum-chuck pads 30 are not pressed against the glass plate 3 by suction, and the vacuum-chuck pads 30 are free to pivot with respect to the glass surface. On the other hand, when compressed gas is withdrawn by the evacuation/compression line, the vacuum-chuck pads 30 are pressed against the glass plate 3, and the pivoting operation of the vacuum-chuck pads 30 is stopped and locked.

The depthwise position adjustment unit 28 basically includes a slide shaft 31, a slide guide 32 and a coil spring 33. The slide shaft 31 is configured and arranged to hold the vacuum-chuck device 27 at the top. The slide guide 32 is configured and arranged to house a locking mechanism that locks the sliding position of the sliding shaft 31. The coil spring 33 is disposed around the periphery of the slide shaft 31 and located between the vacuum-chuck pads 30 and the brackets 29.

The vacuum-chuck device 27 is disposed at the tip on this slide shaft 31. A stopper 34 is attached to the rear end for restricting the maximum protrusion position of the slide shaft 31. When the vacuum-chuck pads 30 are farthest from the glass plate 3, the stopper 34 is positioned at a position whereby it protrudes upwards from the top surface of the slide guide 32 as shown in FIG. 9(A), and when the vacuum-chuck pads 30 are nearest the glass plate 3 (in contact therewith), the stopper 34 is in contact with the top surface of the slide guide 32 as shown in FIG. 9(B).

The slide guide 32 is fixed to the flange 29 described above. The slide shaft 31 is guided and allowed to slide in the upwards and downwards directions in FIGS. 9(A) and (B). A locking mechanism is provided in this slide guide 32 for locking the sliding position of the slide shaft 31. The locking mechanism is configured so that it operates when compressed air is introduced or taken out through an evacuation/pressurization line not shown in the figures. When compressed air is introduced, the locking mechanism is released and the slide shaft 31 causes the vacuum-chuck pads 30 to approach the glass plate 3 as shown in FIG. 9(B) due to the action of the coil spring 33, so that they are in their outermost protruding position. On the other hand, when compressed gas is taken out through the evacuation/pressurization line, the locking mechanism is actuated and the sliding position of the slide shaft 31 is locked.

Figure 10:
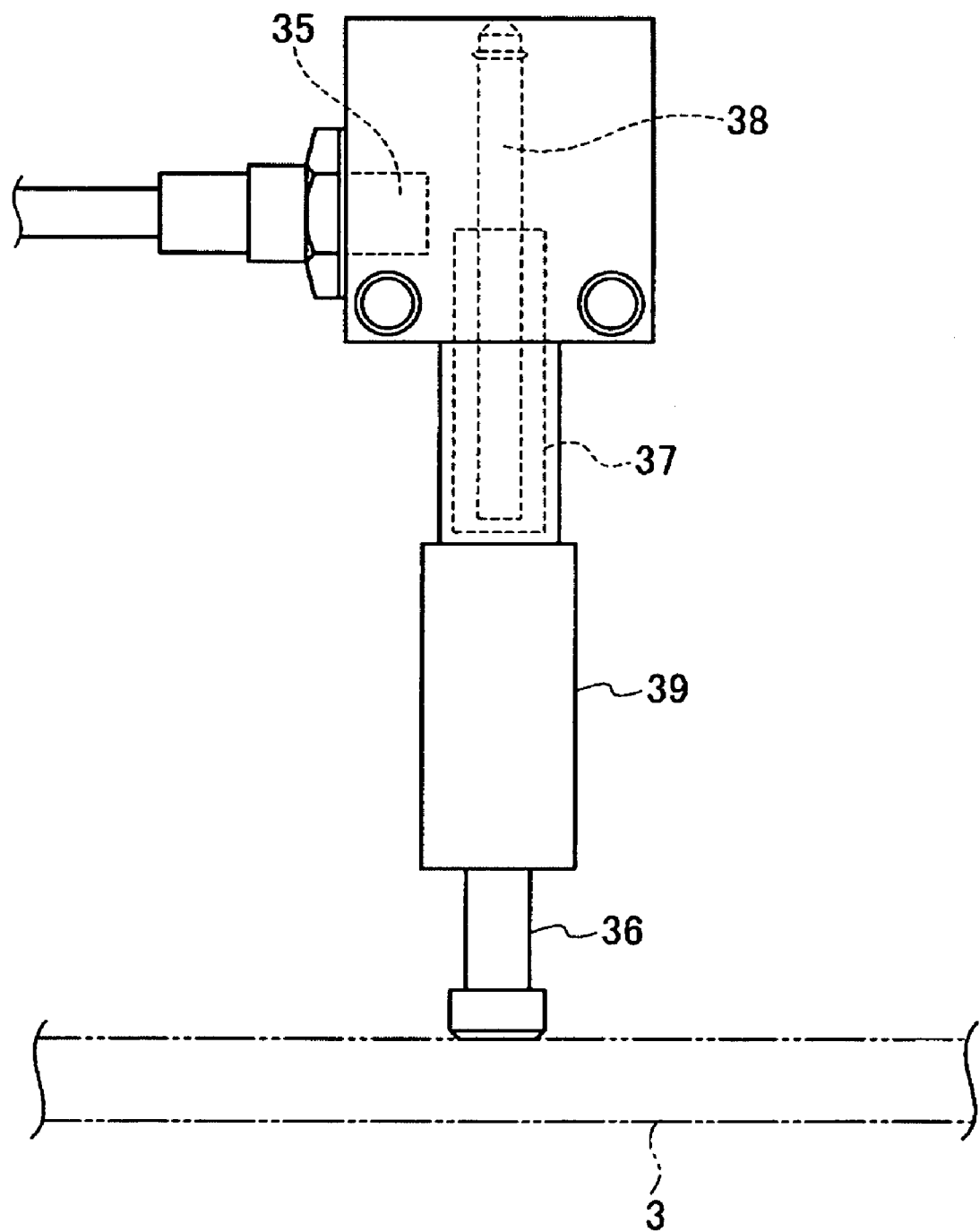
FIG. 10 is simplified elevational view of one of the glass detection units used in the glass transfer system of FIG. 1 in accordance with the illustrated embodiment of the present invention.

Each of the glass detection units 22, as shown in FIG. 10, basically includes a detection switch 35, a detection rod 36 an indirect detector 37, a compression spring 38, and a detector body 39. The detection switch 35 is configured and arranged to detect the presence of the glass plate 3. The detection rod 36 is configured and arranged to turn the detection switch 35 on and off. The indirect detector 37 is configured and arranged above the detection rod 36. Thus, the glass detection units 22 form a workpiece detection mechanism that is configured and arranged to detect the workpiece that is held by the holding mechanism (the vacuum-chuck device 27).

When one of the glass plates 3 is in contact with the tip of the detection rod 36, the detection rod 36 is depressed into the detector body 39. Meanwhile, the indirect detector 37 counters the urging force of the compression spring 38, pushing it upwards, and turning the detection switch 35 on. When the indirect detector 37 is urged downwards by the compression spring 38, it is separated from the detection switch 35, and the switch turns off. When the detection switch 35 is on, this means that one of the glass plates 3 is present, whereas when the switch is off, this means that one of the glass plates is not present.

In this embodiment, the glass plate detection units 22 are disposed in diagonal positions relative to each other so that, even when one of the glass plates 3 is in an inclined position, the presence of the glass plate 3 can be detected.

The glass holding position adjustment unit 23 includes an X-Y table that has the function of aligning the glass holding position in the transverse and longitudinal directions of the glass plate 3, which is held by the vacuum-chuck position adjustment units 21 described above, with respect to the reference holding position of the handling robot 2. The X-Y table basically includes a first table 40, a second table 41, a pair of X-axis guide rails 42, a pair of Y-axis guide rails 43, a plurality of linear guides 44 and a locking mechanism. The first table 40 is fixed on the hand frame 25. The second table 41 is fixed on the wrist part 6 of the handling robot 2. The X-axis guide rails 42 are fixed along the transverse direction of the glass (X direction) above the first table 40. The Y-axis guide rails 43 are fixed along the transverse direction of the glass (Y direction) below the second table 41. The linear guides 44 are provided so that they can slide in both directions of the X-axis guide rails 42 and Y-axis guide rails 43. The locking mechanism locks the sliding of the X-Y table in the X and Y directions. Thus, the glass holding position adjustment unit 23 also form part of the workpiece position adjustment mechanism that is configured and arranged such that a workpiece holding position in which the workpiece is held by the holding mechanism (the vacuum-chuck device 27) is adjustable with respect to the robot 2 in both the longitudinal direction and the transverse direction.

The locking mechanism acts as a result of the introduction of compressed air supplied from an evacuation/pressurization line (not shown in the figures), thereby locking and preventing sliding, while also allowing sliding of the first table 40 in the X direction or Y direction with respect to the second table 41. Since the linear guides 44 are shared, the first table 40 slides with respect to the second table 41 so that sliding in one direction is not possible unless sliding in the other direction is first locked. For this reason, for example, the first table 40 is moved in the X direction with respect to the second table 41 only after the sliding in the Y direction is locked, and the first table 40 is moved in the Y direction with respect to the second table 41 only after the sliding in the X direction is locked.

Figure 11A:
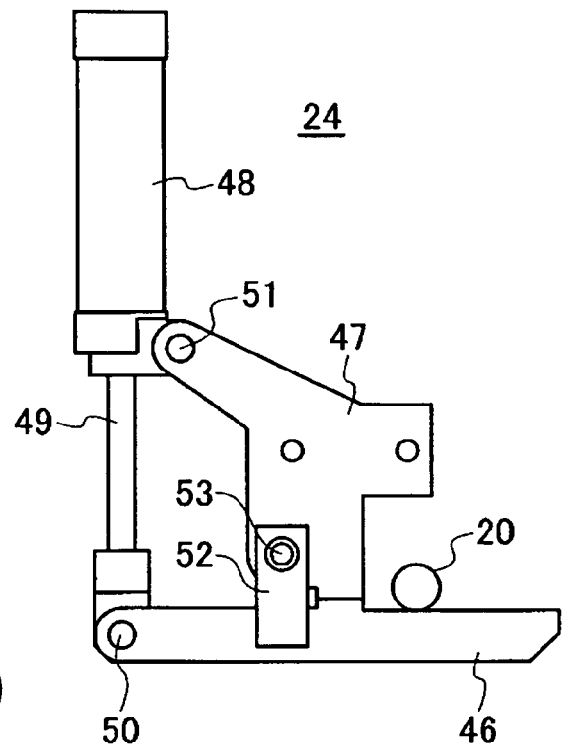
FIG. 11(A) is a simplified elevational view of one of the partitioning plate lowering units used in the glass transfer system of FIG. 1 in accordance with the illustrated embodiment of the present invention, with the vacuum-chuck position adjustment unit in a first operating position.
Figure 11B:
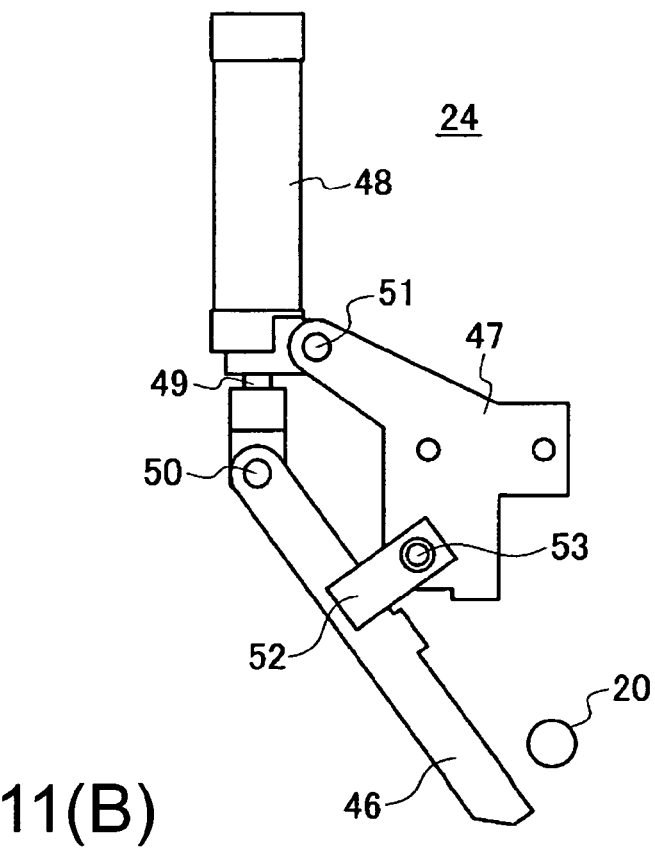
FIG. 11(B) is a simplified elevational view of one of the partitioning plate lowering units used in the glass transfer system of FIG. 1 in accordance with the illustrated embodiment of the present invention, with the vacuum-chuck position adjustment unit in a second operating position.

The partitioning plate lowering units 24 are provided at the tips of the substantially L-shaped support arms 45 that are fixed so that they extend in the transverse direction of the glass (X direction in FIG. 6) from each of the attachment arms 26 provided on the hand frame 25. Each of the partitioning plate lowering units 24, as shown in FIG. 11, basically includes a first arm 46, a second arm 47 and a drive cylinder 48. The first arm 46 is configured and arranged to pop up the pop-up rods 20 of the glass partitioning plates 17 provided on the second pallets 5. The second arm 47 is configured and arranged as a mounting member supporting the first arm 46 and the drive cylinder 48. The drive cylinder 48 serves as the drive power source for rotating the first arm 46. Thus, the partitioning plate lowering units 24 form a partitioning plate lowering mechanism that is configured and arranged to detect the workpiece that is configured and arranged to engage at least one of the partitioning plates of the second pallet 5 to lower the partitioning plate from a non-spacing position to a spacing position in which the workpiece (the glass plate 3) is supported at the prescribed spacing from an adjacent workpiece on the second pallet 5.

The first arm 46 is attached to a tip of the rod 49 of the drive cylinder 48 by a pivot shaft 50. The second arm 47 is attached to the main end of the drive cylinder via a pivot shaft 51. The other end of the second arm 47 is linked to the first arm 46 by a linkage member 52 that is pivotally fixed about a pivot shaft 53. When the drive cylinder 48 operates to retract the rod 49, the first arm 46 that is rotatably attached to the tip of the rod 49 rotates around the shaft 53 that connects with the second arm 47. The pop-up rods 20 of the glass partitioning plates 17 are thus popped up by the first arms 46 along with the rotation of the first arms 46. As shown in FIGS. 4(B) and 4(C), the glass partitioning plates 17 are driven to rotate from a stand-by position in which they do not separate the glass plates 3 to a partitioning position in which they are between the glass plates 3.

A rotating mechanism 60 is provided at the tip of the wrist part 6 of the handling robot 2 for rotating the glass transfer device 7. The rotating mechanism 60 has the function of changing the orientation of the glass plates 3 by 90° when the operation to correct the glass holding position is to be carried out on the glass plate 3 that has been held by the vacuum-chuck position adjustment units 21.

The handling robot 2 equipped with the glass transfer device 7 of the present invention (as discussed above) receives instructions from a controller CPU as seen in FIG. 1. The controller CPU then operates the glass transfer device 7 that attached to the wrist part 6 in accordance with the instructions, as the handling robot 2 moves back and forth over the rails 1.

The controller CPU preferably includes a microcomputer with a transport control program that controls the handling robot 2 and the glass transfer device 7 as to carry out the glass transfer method as discussed below. The controller CPU can also include other conventional components such as an input interface circuit, an output interface circuit, and storage devices such as a ROM (Read Only Memory) device and a RAM (Random Access Memory) device. The memory circuit stores processing results and control programs are run by the processor circuit. It will be apparent to those skilled in the art from this disclosure that the precise structure and algorithms for the controller CPU can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Next, a glass transfer method will be described in which the glass transfer system and the glass transfer device described above are used in order to transfer glass plates 3 from the first pallets 4 to the second pallets 5.

Figure 12A:
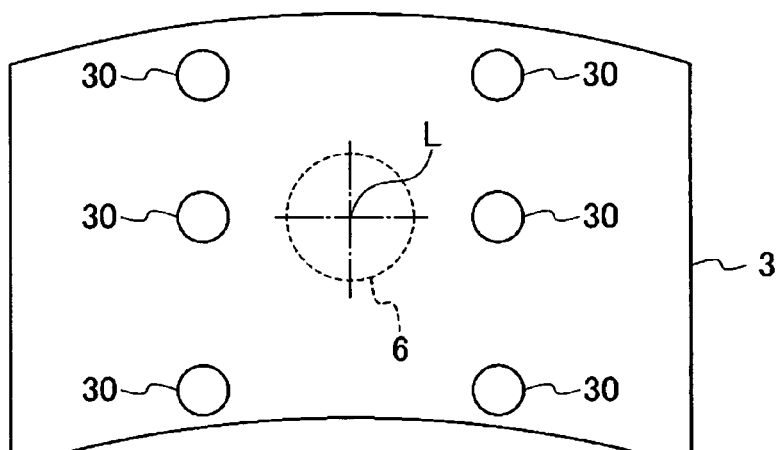
FIG. 12(A) is a schematic positioning state diagram showing the glass holding points and the reference holding position of the robot in a condition in which the glass holding position corresponds to the reference holding position of the robot.
Figure 12B:
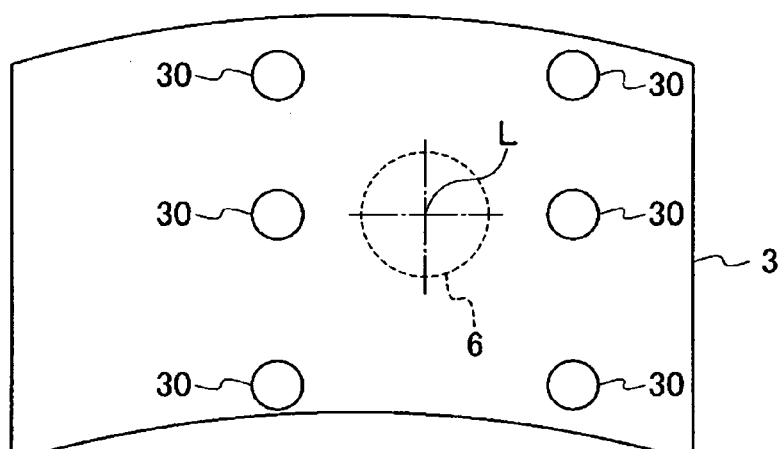
FIG. 12(B) is another schematic positioning state diagram showing the glass holding points and the reference holding position of the robot in a condition in which the glass holding position has shifted to the right in the longitudinal direction of the glass with respect to the reference holding position.
Figure 12C:
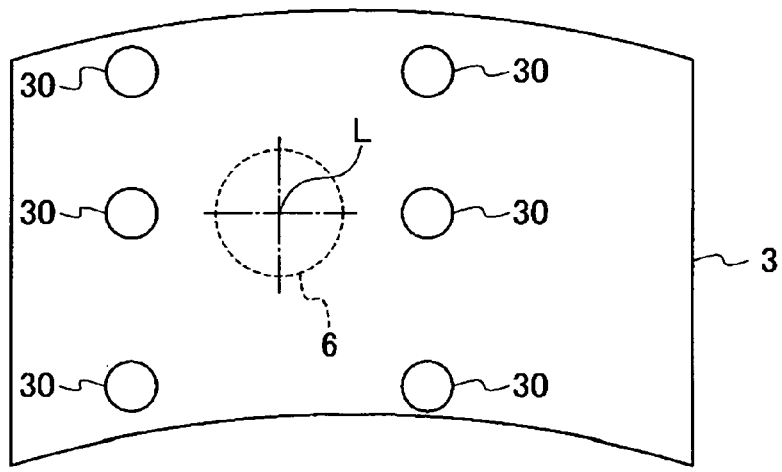
FIG. 12(C) is yet another schematic positioning state diagram showing the glass holding points and the reference holding position of the robot in a condition in which these glass holding position has shifted to the right in the longitudinal direction of the glass with respect to the reference holding position.
Figure 13A:
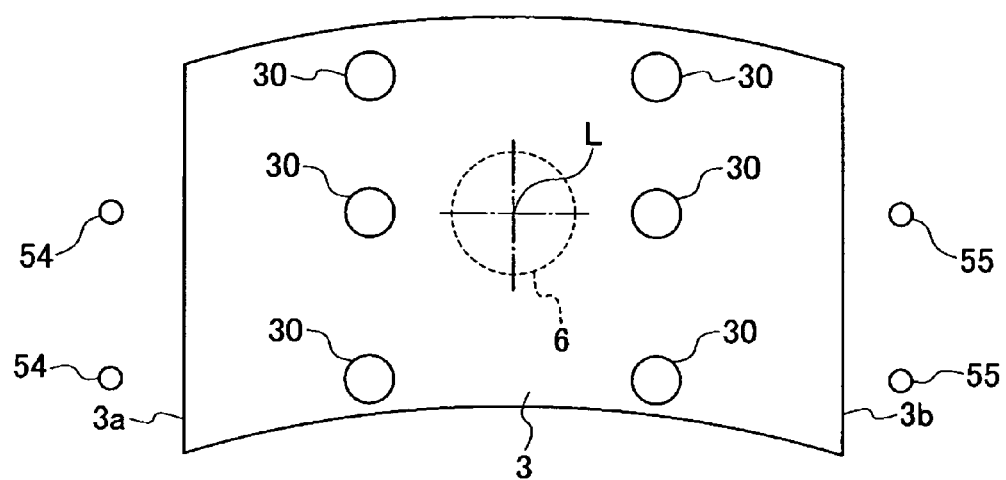
FIG. 13(A) is another schematic positioning state diagram showing the glass holding points and the reference holding position of the robot showing an adjustment method in which the glass holding position is adjusted in a longitudinal direction of glass plates to match the reference holding position of the robot.
Figure 13B:
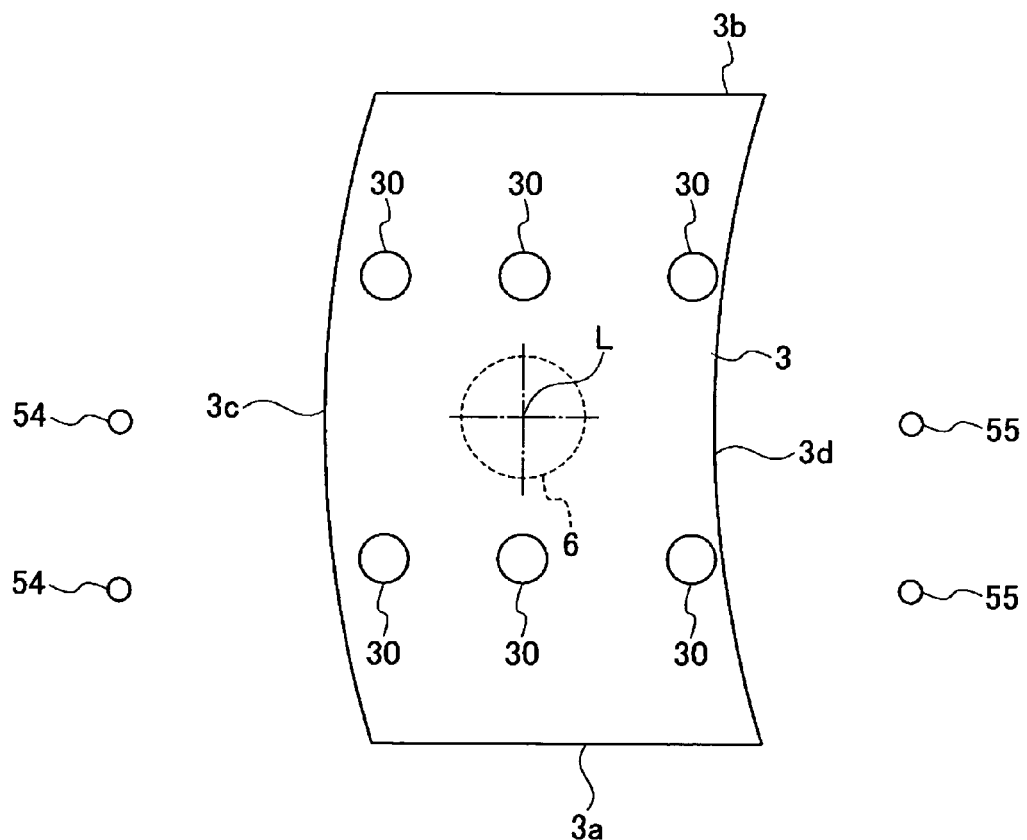
FIG. 13(B) is another schematic positioning state diagram showing the glass holding points and the reference holding position of the robot showing an adjustment method in which the glass holding position is adjusted in a transverse direction of glass plates to match the reference holding position of the robot.
Figure 14:
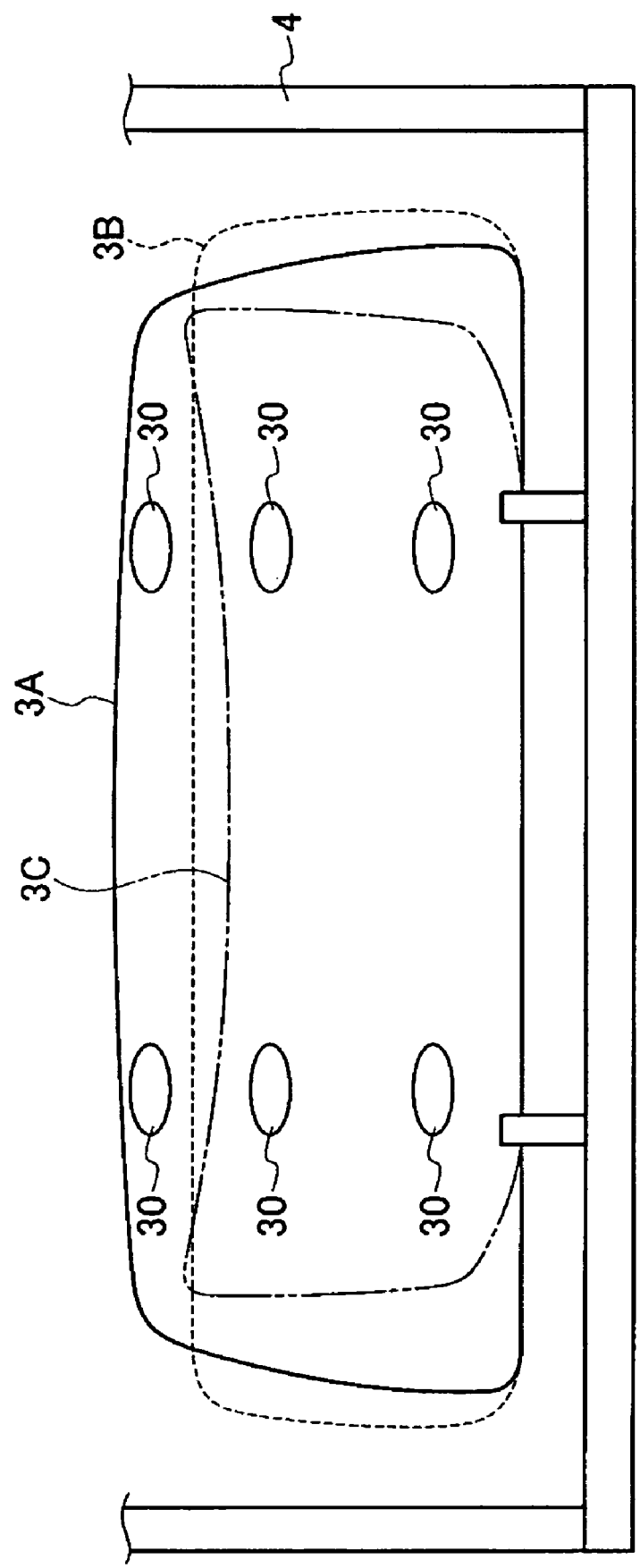
FIG. 14 is a simplified diagram of a condition in which different types of glass plates that depend on the vehicle type or model are held by the vacuum-chuck position adjustment unit.
Figure 15:
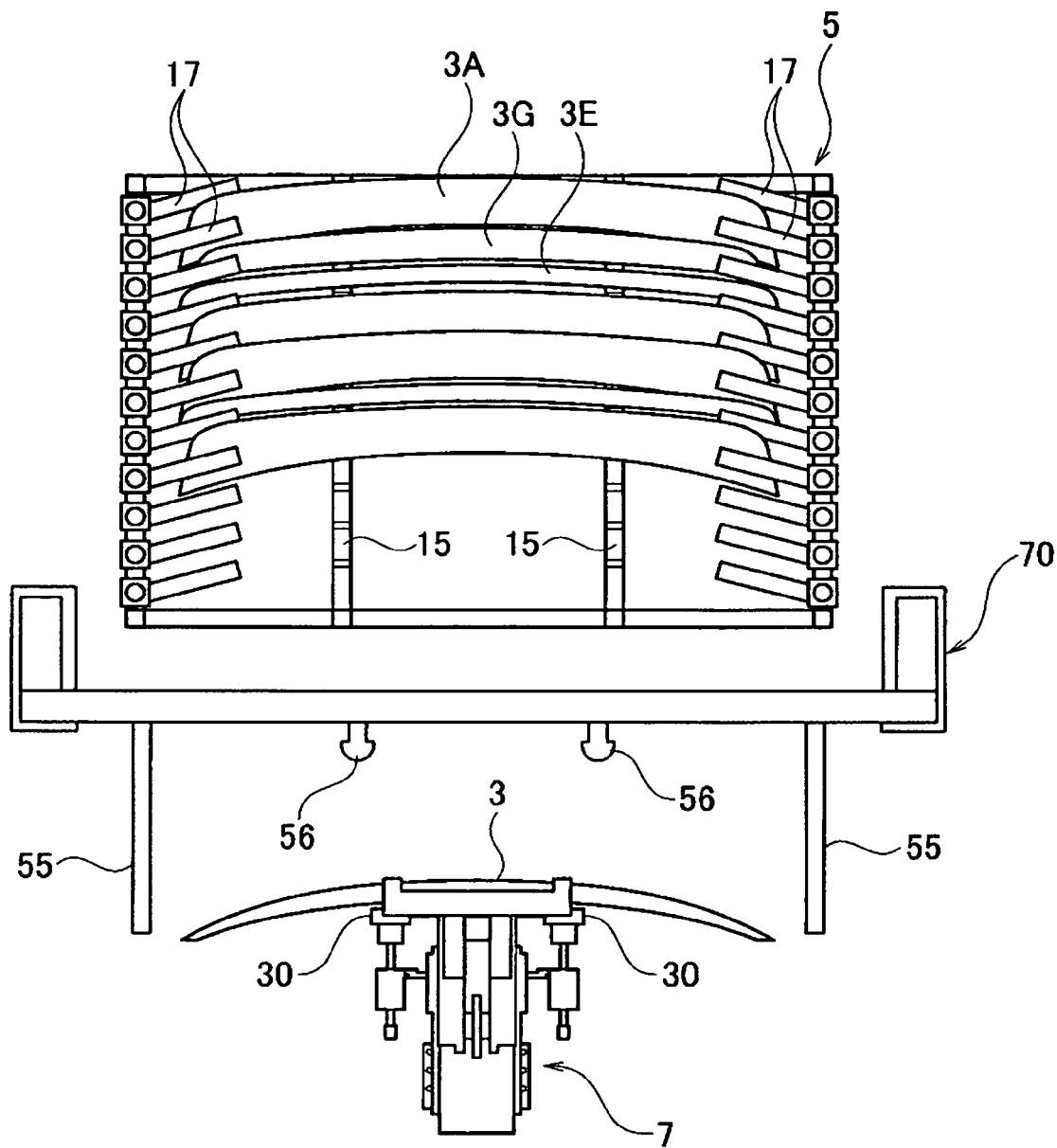
FIG. 15 is a simplified top plan view of an operational state of a portion of the glass transfer system of FIG. 1 during an operation in which the glass holding position in a depthwise direction of the glass plates is aligned with respect to the reference holding position of the handling robot.
Figure 16:
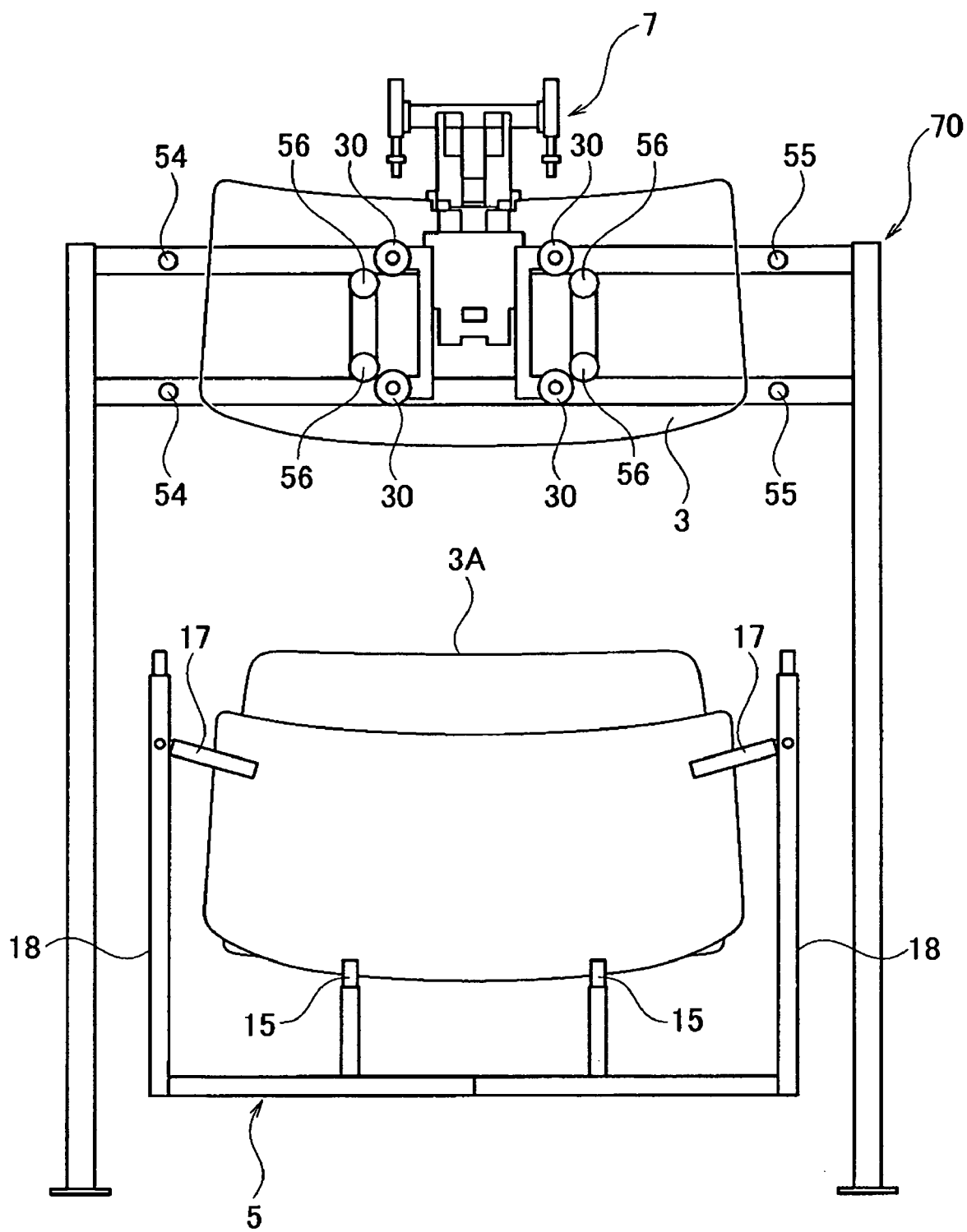
FIG. 16 is a simplified front elevational view of the operational state illustrate in FIG. 15 of the portion of the glass transfer system of FIG. 1 during an operation in which the glass holding position in the depthwise direction of the glass plates is aligned with respect to the reference holding position of the handling robot.
Figure 17:
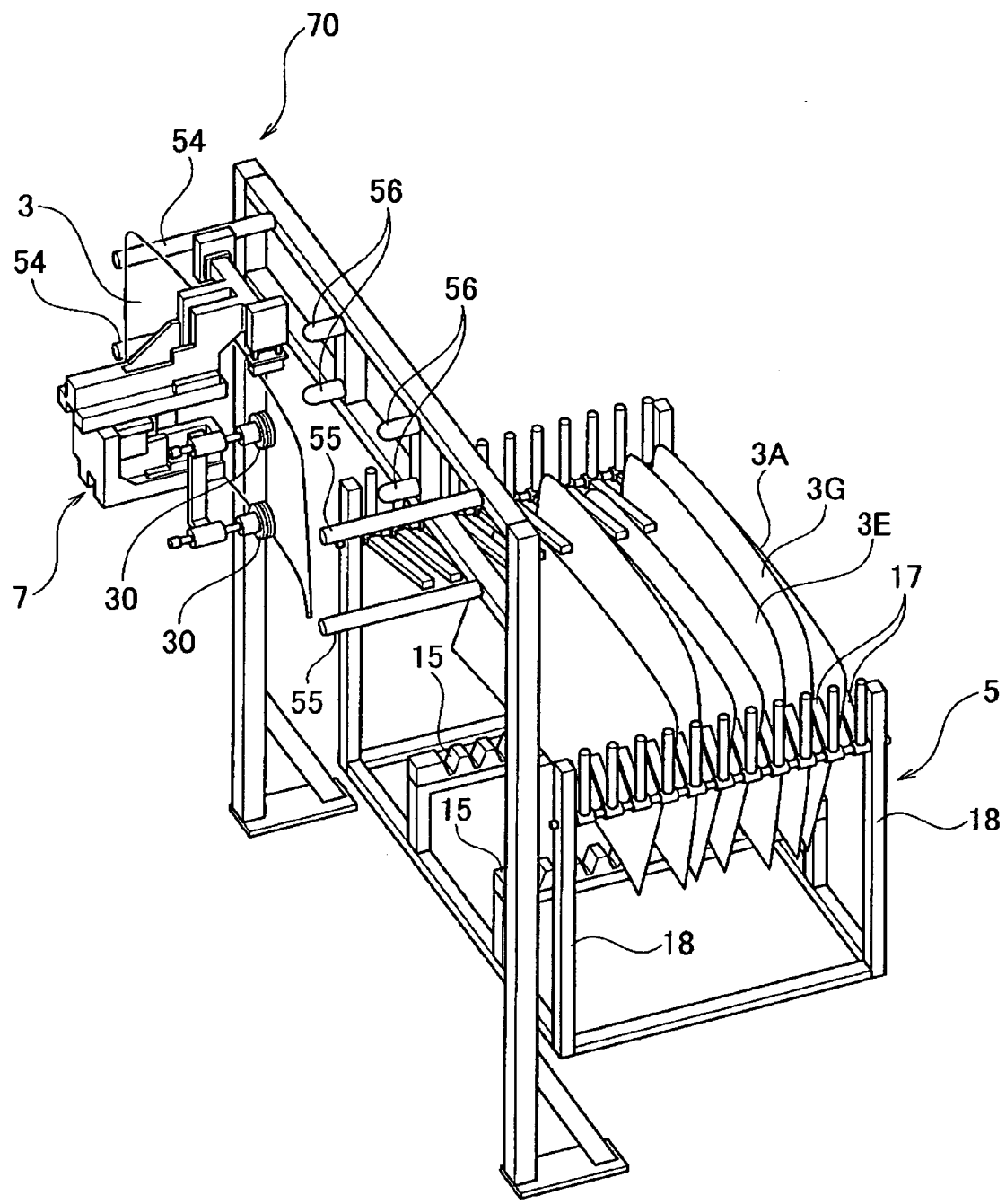
FIG. 17 is a simplified perspective view of an operational state of a portion of the glass transfer system of FIG. 1 during an operation in which the glass holding position in the transverse and longitudinal directions of the glass is aligned with respect to the reference holding position of the handling robot.
Figure 18:
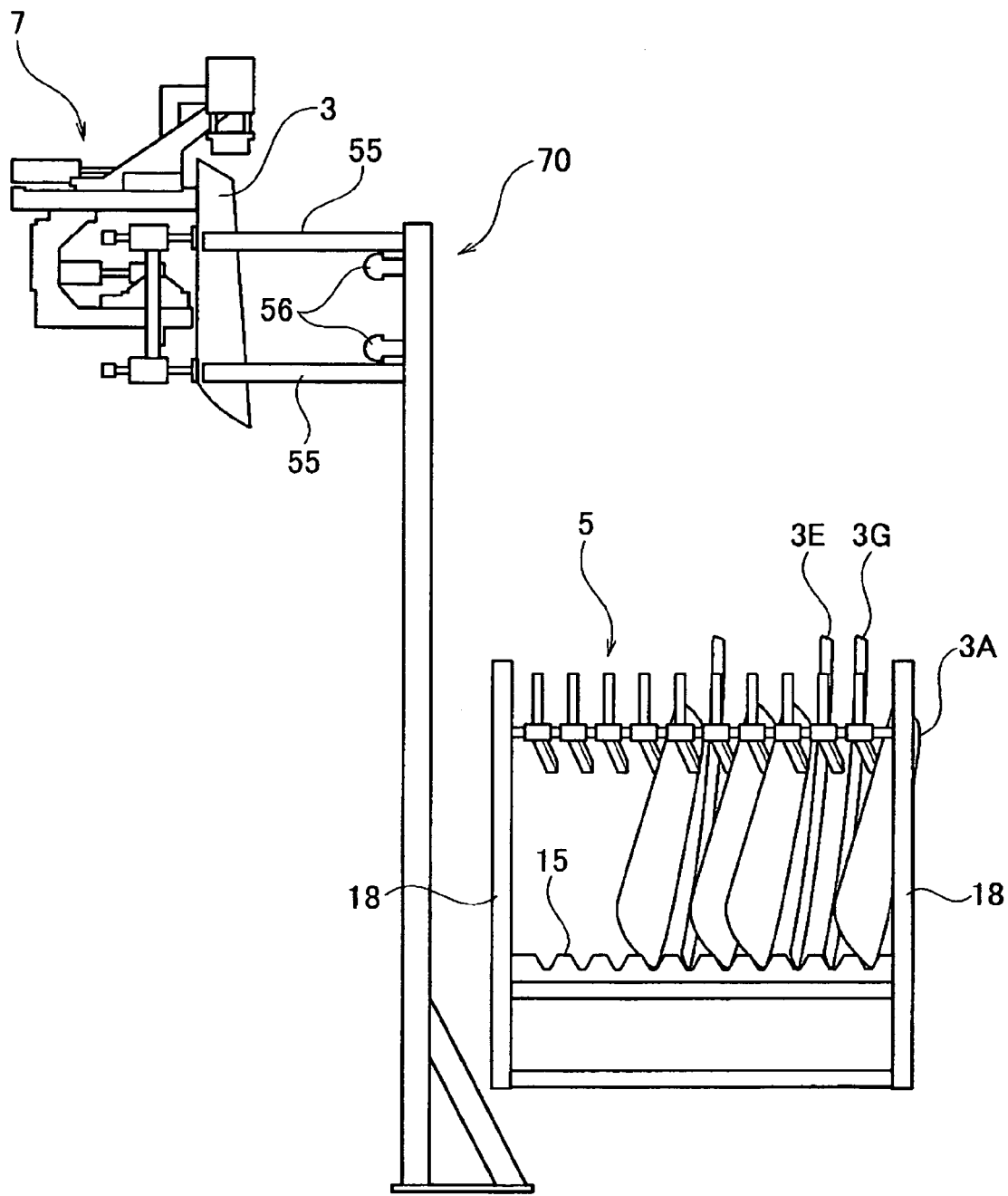
FIG. 18 is a simplified side elevational view of an operational state of a portion of the glass transfer system of FIG. 1 during an operation in which the glass holding position in the transverse and longitudinal directions of the glass is aligned with respect to the reference holding position of the handling robot.

FIGS. 12(A) to 12(C) are schematic diagrams showing the glass holding position and the reference holding position of the robot 2 for different orientations of one of the glass plates 3. FIG. 12(A) shows a condition in which the glass holding position corresponds to the reference holding position of the robot 2. FIG. 12(B) shows a condition in which the glass holding position is shifted or offset to the right in the longitudinal direction of the glass plate 3 with respect to the reference holding position. FIG. 12(C) shows a condition in which the glass holding position have shifted or offset to the left in the longitudinal direction of the glass plate 3 with respect to the reference holding position. FIGS. 13(A) and 13(B) shows an adjustment method in which the glass holding position is adjusted in the longitudinal direction of the glass plate 3 and the transverse direction of the glass plate 3 to match the reference holding position. FIG. 13(A) shows positional adjustment in the longitudinal direction of the glass plate 3 to match the reference holding position of the robot 2. FIG. 13(B) shows positional adjustment in the transverse direction of the glass plate 3 to match the reference holding position of the robot 2. FIG. 14 shows a condition in which different glass plate types for different vehicle types or models are held by the vacuum-chuck position adjustment units 21. FIG. 15 is a top plan view showing the operational state during the operation in which the glass holding position in the depthwise direction of the glass are aligned with respect to the reference holding position of the handling robot 2. FIG. 16 is a front elevational view showing an operational state for an operation in which the glass holding position in the depthwise direction of the glass plates is aligned with respect to the reference holding position of the handling robot 2. FIG. 17 is a perspective view showing the operational state for an operation in which the glass holding position in the transverse and longitudinal direction of the glass are aligned with respect to the reference holding position of the handling robot 2. FIG. 18 is a side elevational view showing an operational state for an operation in which the glass holding position in the transverse and longitudinal directions of the glass are aligned with respect to the reference holding position of the handling robot.

The term "workpeice holding position" used herein denotes the position of the glass plate 3 (workpiece) in a state in which the glass plate 3 is held relative to the glass transfer device 7, as viewed from the handling robot 2. When repeating the operation in which the glass plate 3 is taken out from one of the first pallets 4 by the glass plate transfer device 7, variation in the workpiece holding position occurs as a result of variation in part precision and assembly precision of the pallets 4. The robot reference holding position is the position of the glass plate 3 in a state in which the glass plate 3 is held by the glass transport device 7 relative to the handling robot 2, as viewed from the handling robot 2. Thus, the robot reference holding position refers to the proper position of the glass plate 3 for allowing proper insertion of the glass plate 3 into one of the second pallets 5 during the operation in which the glass plate 3 is inserted into a second pallet 5 by the handling robot 2. There are cases where variation in the glass holding position occurs as a result of variation in the pallets 4, as mentioned above. Thus, there are cases in which the glass plate 3 cannot be held in the proper position for insertion of the glass plate 3 into the second pallet 5. However, when the glass holding position is aligned with the robot reference holding position, a preset instruction operation can be carried out by the robot 2 in order to allow insertion of the glass plate 3 into the proper position on the second pallet 5.

The handling robot 2 first receives instructions from the controller CPU and moves to the position where a selected one of the first pallets 4 is disposed in accordance with a vehicle production sequence. For example, the handling robot 2, as shown in FIG. 1, moves along the robot transport path along the rails 1 described above to the position of the first pallet 4D, which is closest to the entry position of the second pallet 5, and stops at a position opposite the first pallet 4D. Next, the glass transfer device 7 that is attached to the wrist part 6 of the handling robot 2 moves towards the glass plate 3D that is supported on the first pallet 4D.

When the glass transfer device 7 approaches the glass plate 3D, as shown in FIGS. 6 and 7, the vacuum-chuck pads 30 of the vacuum-chuck position adjustment units 21 come into contact with the glass plate 3. At this time, the locks in the vacuum-chuck devices 27 and the position adjustment mechanisms 28 are each in a released state. Thus, the vacuum-chuck pads 30 are pivoted, oscillated, and advanced or retracted with respect to the glass plate 3 in accordance with the contour (curves) of the glass plate 3. When the vacuum-chuck pads 30 thus conform to the contour of the glass plate 3, the vacuum-chuck devices 27 are locked, and the glass plate 3 is handled by the vacuum-chuck pads 30. The sequence of operations of the handling robot 2 is programmed beforehand for the first pallet 4, and the same operations are carried out during transport of glass plates 3 for the same vehicle model. In other words, the position of the handling robot 2 and the glass transfer device 7 remain the same in each case when the glass plates 3 are held and transported. The approach position in which the glass transport device 7 holds the glass plate 3 changes each time, as does the position of the handling robot 2 in the depthwise direction of the first pallet 4. However, the controller CPU for the system counts the number of remaining glass plates on the first pallet 4. Thus, the controller CPU is configured so that the approach position is automatically determined in accordance with the remaining number of sheets.

Subsequently, the glass plate 3 that has been held by the vacuum-chuck pads 30 is lifted upwards from and out of the first pallet 4. The glass plate 3 is then transported along the rails 1 by the robot 2 to the ends of the rails 1 that is adjacent to the second pallet 5 that is located at the ends of the rails 1. In particular, as shown in FIGS. 15 to 17, a reference pin fixing support 70 is located adjacent the second pallet 5 that is to be loaded. The reference pin fixing support 70 has a plurality of reference pins 54, 55 and 56 that form a positional adjustment part for contacting the glass plate 3 (workpiece) to align the workpiece in a depthwise direction of the workpiece, a widthwise direction of the workpiece and a longitudinal direction of the workpiece, as discussed below.

As shown in FIGS. 7, 15 and 16, the glass plate 3 is moved at a prescribed distance toward the reference pins 56 for adjusting the position in the depthwise direction of the glass plates 3. The reference pins 56 are provided on an upper part of the reference pin fixing support 70 that is disposed in front of the second pallet 5. Preferably several, e.g., four, reference pins 56 are provided at a prescribed spacing for contacting the front surfaces 3 of the glass plates 3 to adjust the position in the depthwise direction of the glass plates 3. When one of the glass plates 3 is pressed against the reference pins 56 for adjusting the position in the depthwise direction of the glass plates, the glass holding position in the depthwise direction of the glass is aligned with respect to the reference holding position of the handling robot 2 (center position C of the wrist part 6). When this glass holding position and the reference holding position of the handling robot correspond, the depthwise position adjustment unit 28 is locked, and the glass holding position is fixed.

The conditions in which the glass plate 3 are handled by the vacuum-chuck position adjustment units 21 in this manner includes a condition where the glass holding position of the glass plate 3 matches the actually vacuum-chuck positions set by the reference holding position of the handling robot 2 (center position C of the wrist part 6) as seen in FIG. 12(A), and a condition where the glass holding position of the glass plate 3 is shifted to the left or right in the longitudinal direction of the glass with respect to the reference holding position of the handling robot 2 as seen in FIGS. 12(B) and (C). Positional shifting arises as a result of variation in the assembly precision of the first pallet 4, variation in the size of each of the first pallets 4, or variation in placement of the glass plates 3 on the first pallets 4.

Next, the detection rods 36 of the glass detection units 22 come into contact with the glass plate 3. The controller CPU then determines whether the vacuum-chuck position adjustment units 21 are holding one of the glass plates 3 using the glass detection units 22. If one of the glass plates 3 is not detected, then one of the glass plates 3 has not been vacuum-chucked. Thus, the operation involving vacuum chucking of the glass plate 3 is carried out again.

If vacuum-chucking of the glass plate 3 by the vacuum-chuck devices 27 is confirmed; then locking of the glass holding position adjustment unit 23 in the widthwise direction (X direction in FIG. 6) of the glass plates is released (with the glass locked in the longitudinal direction), and the glass transport device 7 is in a condition whereby it is free to move in the longitudinal direction of the glass plate 3. As a result, a condition is produced in which the first table 40 can move in the longitudinal direction of the glass relative to the second table 41 that is fixed on the wrist part 6.

Now, the glass plate 3 that is handled by the vacuum-chuck position adjustment units 21 is centered in the longitudinal direction of the glass plate 3 using the reference pins 54 and 55 that are provided on opposite sides of the glass plate 3. In particular, the glass plate 3 has its opposite ends 3a and 3b being aligned substantially linearly in the transverse direction of the glass plate 3, as shown in FIGS. 13(A), 17 and 18. Thus, the handling robot 2 moves the glass plate 3 that is handled by the vacuum-chuck position adjustment units 21 toward the reference pins 54 and 55 by the same predetermined distance for adjusting the position in the longitudinal direction of the glass plate 3. The reference pins 54 and 55 are disposed at equivalent distances in the transverse direction of the glass from the reference holding position of the handling robot 2 when positional adjustment is to be carried out for adjusting the position in the longitudinal direction of the glass plates. Thus, the distance that the handling robot 2 moves is set to be approximately the same as the distance from the reference pin 54 or 55 for adjusting the position in the longitudinal direction of the glass plates to the end 3a or 3b when the glass holding position corresponds to the reference holding position of the handling robot 2.

When the ends 3a and 3b of the glass plate 3 are at an angle with respect to the longitudinal so that the distances from the respective reference pin 54 and 55 are different for adjusting the position in the transverse/longitudinal direction of the glass plates to the ends 3a and 3b of the glass plate 3, then the distance from the ends 3a and 3b of the glass plate 3 to the nearest reference pin 54 (55) is preferably set to be the distance that the handling robot 2 moves for adjusting the position in the transverse/longitudinal direction of the glass plates. When the position of the reference pins 54 and 55 for adjusting the position of the glass plate 3 in longitudinal direction of the glass plates, the distances of movement of the handling robot 2 are set in this manner. Then, as shown in FIGS. 12(B) and 12(C), when the glass holding position and the reference holding position of the handling robot 2 are off, one of the ends 3a and 3b of the glass plate 3 will come into contact with one set of the reference pins 54 and 55 for adjusting the position in the longitudinal direction of the glass plate 3. As a result, the first table 40 will slide correspondingly in the longitudinal direction of the glass relative to the second table 41, so that the glass holding position aligns with respect to the reference holding position of the handling robot 2.

Next, after the glass plate 3 has been rotated by 90° using the rotating mechanism 60, the lock for the vertical direction (Y direction in FIG. 6) of the glass holding position adjustment unit 23 is released (locked in the longitudinal direction of the glass), and the glass transport device 7 is freed so that the glass transport device 7 can move in the transverse direction of the glass plate 3. As a result, the first table 40 is freed so that the first table 40 can move in the transverse direction of the glass plate 3 relative to the second table 41 fixed on the wrist part 6.

Now the glass plate 3 is centered with respect to the two opposite longitudinal ends 3c and 3d of the glass plate 3. The two opposite longitudinal ends 3c and 3d have a substantially curved shape along the longitudinal direction of the glass plates 3. The glass plate 3 is handled by the vacuum-chuck position adjustment units 21, as shown in FIG. 13(B), to be moved approximately the same predetermined distance in the direction of the reference pins 54 and 55 for adjusting the position in the transverse/longitudinal direction of the glass plate 3. The reference pins 54 and 55 are provided at the top of the reference pin fixing support 70. The distance that the handling robot 2 moves is set to be approximately equivalent to the distance from the reference pins 54 and 55 for adjusting the position in the transverse/longitudinal direction of the glass plates to the ends 3c and 3d when the reference holding position of the handling robot 2 corresponds to the glass holding position. When the distances from each of the reference pins 54 and 55 are different for adjusting the position in the transverse direction of the glass plates to the ends 3c and 3d because the ends 3c and 3d have curved shapes, it is preferable for the distance from the ends 3c and 3d to the nearest reference pins 54 (55) for adjusting the position in the transverse direction of the glass plates to be set at the distance that the handling robot 2 is to move. When the position of the reference pins 54 and 55 are set in this manner for adjusting the position in the transverse/direction of the glass plates and the distance of movement of the handling robot 2, one of the ends of the glass plate 3 will contact one set of the reference pins 54 and 55 for adjusting the position in the transverse direction of the glass plates when the glass holding position and the reference holding position of the handling robot 2 are off in the transverse direction of the glass. As a result, the first table 40 will slide correspondingly in the transverse direction of the glass relative to the second table 41, so that the glass holding position aligns with respect to the reference holding position of the handling robot 2.

Thus, when the glass holding position in the transverse and longitudinal directions of the glass corresponds with respect to the reference holding position of the handling robot 2, the glass holding position adjustment unit 23 is locked, and sliding of the first table 40 with respect to the second table 41 in the transverse direction and longitudinal direction of the glass is prevented from occurring. As a result, the glass holding position in the depthwise, transverse, and longitudinal directions of the glass and the reference holding position of the handling robot are subjected to positional correction prior to transfer to the second pallet 5, thereby completing the operation to correct the glass holding position.

Next, assuming the glass plate 3 has been properly positioned on the handling robot 2, the glass plate 3 is then transferred to the second pallet 5 by the handling robot 2. After placing the glass plate 3 in the prescribed position on the second pallet 5, the vacuum of the vacuum-chuck pads 30 are released and the glass plate 3 is placed on the second pallet 5. The partitioning plate lowering unit 24 then operates to lower a pair of the glass partitioning plates 17, and the space between each of the glass plates 3 is partitioned by the glass partitioning plates 17. In the same manner as the above-described glass removal operation whereby the glass plates 3 are taken out from the first pallet 4, the handling robot 2 is programmed in advance to carry out the operation to insert the glass plate 3 into the second pallet 5 and the operation to adjust the glass position.

In this manner, a routine is repeated in which the prescribed glass plate 3 is taken out from the first pallet 4 in accordance with the vehicle assembly production sequence, an operation to correct the glass holding position is carried out in which the glass holding position of the glass plate 3 is made to correspond with respect to the reference holding position of the handling robot 2, and the glass plate is then transferred to the second pallet 5 in accordance with the assembly production sequence. Once the second pallet 5 is full of glass plates 3, the pallet 5 is moved to the exit position, and the next second pallet 5 is moved to the glass transfer position. All of the glass plates 3 are thereby transferred by repeating this routine.

In FIG. 14, the sizes of the glass plates 3A, 3B, and 3C are different in cases where the vehicle type is different. Of the six vacuum-chuck pads 30, only a few are used in order to vacuum-chuck the glass plates 3A, 3B, or 3C. For example, the glass plates 3B and 3C are small and are used for small-size vehicles, unlike the glass plates 3A, which are large and are used for mid-size vehicles. Consequently, the glass plates 3B are held using only four vacuum-chuck pads 30 of the six vacuum-chuck pads 30.

Thus, in the correction operation whereby the glass holding position in the transverse and longitudinal directions of the glass plates 3 are adjusted to align with respect to the reference holding position of the handling robot 2, the two opposite linear ends 3a and 3b arranged in a substantially straight line in the transverse direction of the glass in FIG. 13(A) initially come into contact with the positional adjustment reference pins 54 and 55. Subsequently, the two opposite ends 3c and 3d that form a curved shape in the longitudinal direction of the glass in FIG. 13(B) come into contact with the positional adjustment reference pins 54 and 55 for adjusting the position in the transverse/longitudinal direction of the glass plates. This sequence of this correction operation is preferable for the reasons described below.

Specifically, in contrast to the sequence described above, if the curved ends 3c and 3d were initially abutted against the reference pins 54 and 55 for adjusting the position in the transverse/longitudinal direction of the glass plates, and then the linear ends 3a and 3b come into contact with the reference pins 54 and 55 for adjusting the position in the transverse/longitudinal direction of the glass plates, then position in which the reference pins 54 and 55 strike the curved ends 3c and 3d will be different each time. Although the distance and position that the handling robot 2 travels with respect to the reference pins 54 and 55 is the same each time for adjusting the position in the transverse/longitudinal direction of the glass plates, because the curved ends 3c and 3d have a curved shape, variation in positional adjustment will be great due to the differences in pin striking positions. For this reason, the position of the glass plate 3 after striking the pins will be outside the allowed range of positions, and the proper position will not be taken. In contrast, when the straight or linear ends 3a and 3b make initial contact, the pin striking position will be within the allowed range of positions of the glass plate because the difference in dimensions of the linear regions is small, although there will be some degree of variation. In addition, as shown in FIG. 14, the glass plates 3A, 3B, and 3C have different curved ends that vary to some degree depending on differences in the vehicle type. Thus, the undesirable situation described above occurs to a dramatic degree when the ends that have a curved shape are the first to contact the pins and a correction operation is carried out. Consequently, it is preferable to perform the correction operation in the sequence described in the above embodiment.

In accordance with the glass transfer method of the invention, an operation to correct the glass holding position is carried out. In this operation, the glass holding position, in which the glass transfer device 7 holds the glass plate 3, is made to align with respect to the reference holding position of the handling robot 2. Therefore, the operation to correct the glass holding position can be carried out in order to eliminate variation in the position in which the first pallet 4 is disposed on the platform 8, variation in the position in which the glass plates 3 are placed on the first pallets 4, or variation in the size of the first pallets 4. Consequently, the glass plates 3 that are taken out from the first pallet 4 can be placed properly on the second pallet 5 without using expensive equipment such as visual sensors.

By using the glass transfer method of the present invention, the operation to adjust the glass position involves positioning the glass plates in the depthwise direction, transverse direction, and longitudinal direction of the glass plates. Adequate positional correction can therefore be carried out, and the glass plates 3 can be uniformly placed on the second pallet 5.

In accordance with the glass transfer method of the invention, it is also possible to align the glass holding position with respect to the reference holding position of the robot when the two linear ends 3a and 3b in the transverse direction of the glass plates 3 initially come into contact with the reference pins 54 and 55. Because the two curved ends 3c and 3d extending in the longitudinal direction of the glass plates 3 come into contact with the reference pins 54 and 55, and the glass holding position is aligned with respect to the reference holding position of the robot, accurate correction operations can be carried out on multiple types of glass plates 3 having varying curved shapes.

After placing the glass plate 3 held by the glass transport device 7 on the second pallet 5 in accordance with the glass transfer method of the invention, two of the glass partitioning plates 17 on the second pallet 5 are lowered so that the glass plates 3 are placed at the prescribed spacing, thereby completely eliminating manual work on the part of an operator.

In accordance with the glass transfer system of the invention, the glass transfer device 7 has a position adjustment unit or device that is mechanical and devoid of any complicated and difficult processes in which the glass plate holding positions are subjected to image processing by using an image capture device such as a visual sensor. Consequently, the glass holding position in which the glass plate 3 is held by this device can be aligned with respect to the reference holding position of the handling robot 2, allowing easy maintenance and decreasing equipment costs. Moreover, each of the glass plates 3 can be arranged by being transferred from the first pallet 4 to the second pallet 5.

The glass transfer device of the invention has the vacuum-chuck position adjustment units 21 with the vacuum-chuck devices 27 that hold the glass plates 3 and the depthwise position adjustment unit 28 whereby the glass holding position in the depthwise direction of the glass plate 3 are made to correspond to the reference holding position of the robot. The glass holding position adjustment unit 23 adjusts the glass holding position in the transverse and longitudinal directions of the glass plates 3 are made to correspond to the reference holding position of the handling robot 2. Consequently, the cost of the glass transport device 7 can be decreased because positional adjustment is carried out by mechanically without complicated and troublesome processes that involve image processing of glass holding position by using an imaging device such as a visual sensor. Moreover, it is possible to transfer the glass plates from the first pallet 4 to the second pallet 5.

In accordance with the glass transfer device of the invention, the rotating mechanism 60 is provided that rotates the direction of the glass plate 3 that has been held by the vacuum-chuck position adjustment units 21, so that positional deviations can be corrected in both the transverse and longitudinal directions of the glass plates 3.

In accordance with the glass transfer device of the invention, the glass plate 3 that is held by the vacuum-chuck position adjustment units 21 comes into contact with reference pins 54, 55 and 56, so that the glass plates are positioned in the depthwise direction, transverse direction, and longitudinal direction of the glass plates 3 allowing for positional variations to be corrected using a simple mechanism, and equipment costs to be reduced.

The glass transfer device of the invention has the partitioning plate lowering units 24 whereby, after arranging the glass plate 3 that has been held by the vacuum-chuck position adjustment units 21 on the second pallet 5, the glass partitioning plates 17 that have been provided on the second pallet 5 are lowered, thereby arranging and separating the glass plates 3 at a prescribed spacing. Consequently, operations that have been previously carried out manually are automated, thereby improving production performance.

As described above, the invention is not restricted to examples in which the reference pin fixing support 70 is provided at a position above the second pallet 5. Positioning can also be carried out immediately after discharge by providing the support at the stage prior to the discharge opening for the first pallet 4. Workpieces that are to be handled are also not restricted to glass plates, and steel or resin panel parts and the like may also be used. However, the material is to have a degree of rigidity whereby the workpiece itself will not deform during contact of the workpiece with the position adjustment mechanism.

Figure 19:
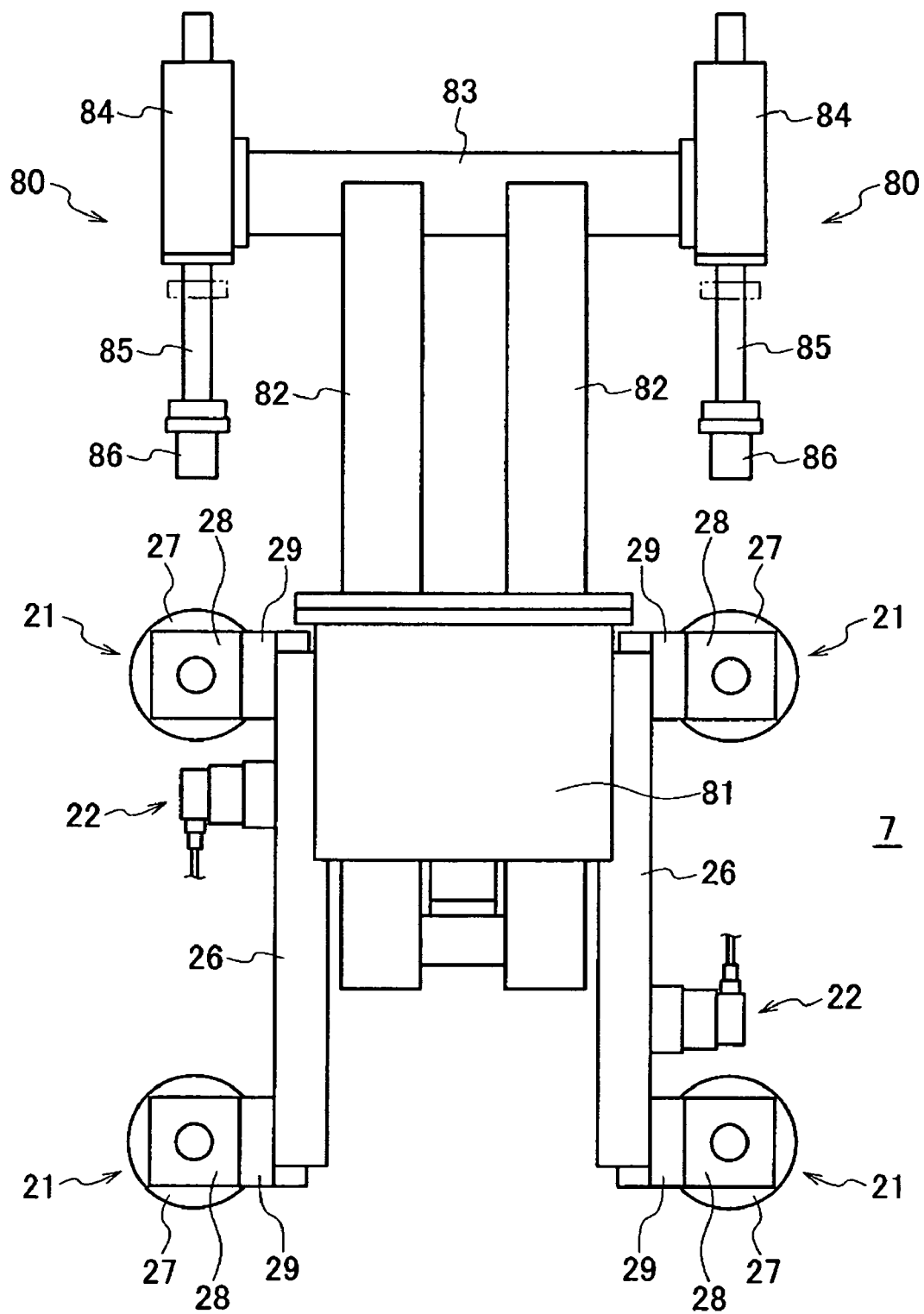
FIG. 19 is a simplified top plan view of the glass transfer device equipped with a glass pressure unit in accordance with the illustrated embodiment of the present invention.
Figure 20:
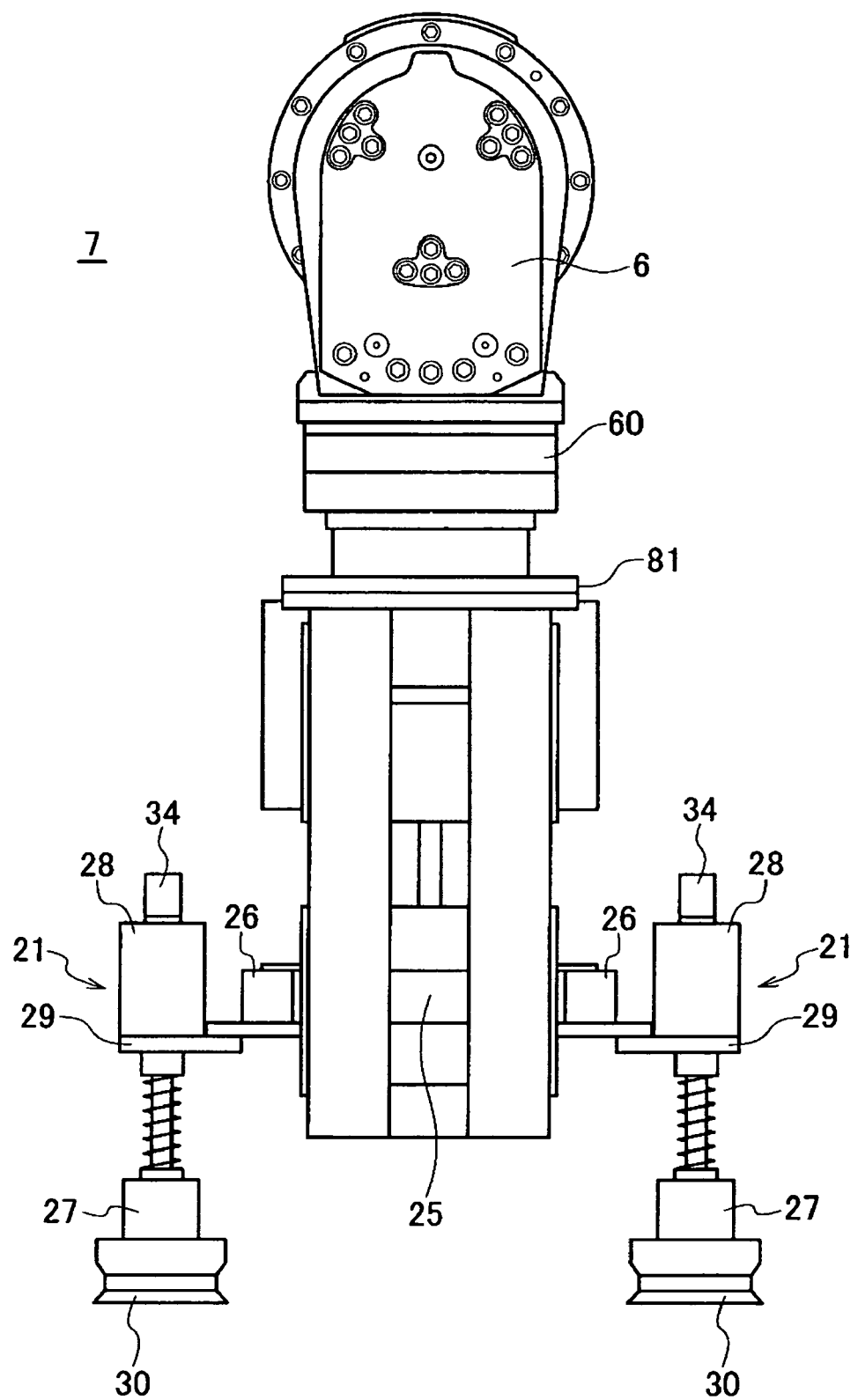
FIG. 20 is a simplified front elevational view of the glass transfer device illustrated in FIG. 19 that is equipped with the glass pressure unit in accordance with the illustrated embodiment of the present invention.
Figure 21:
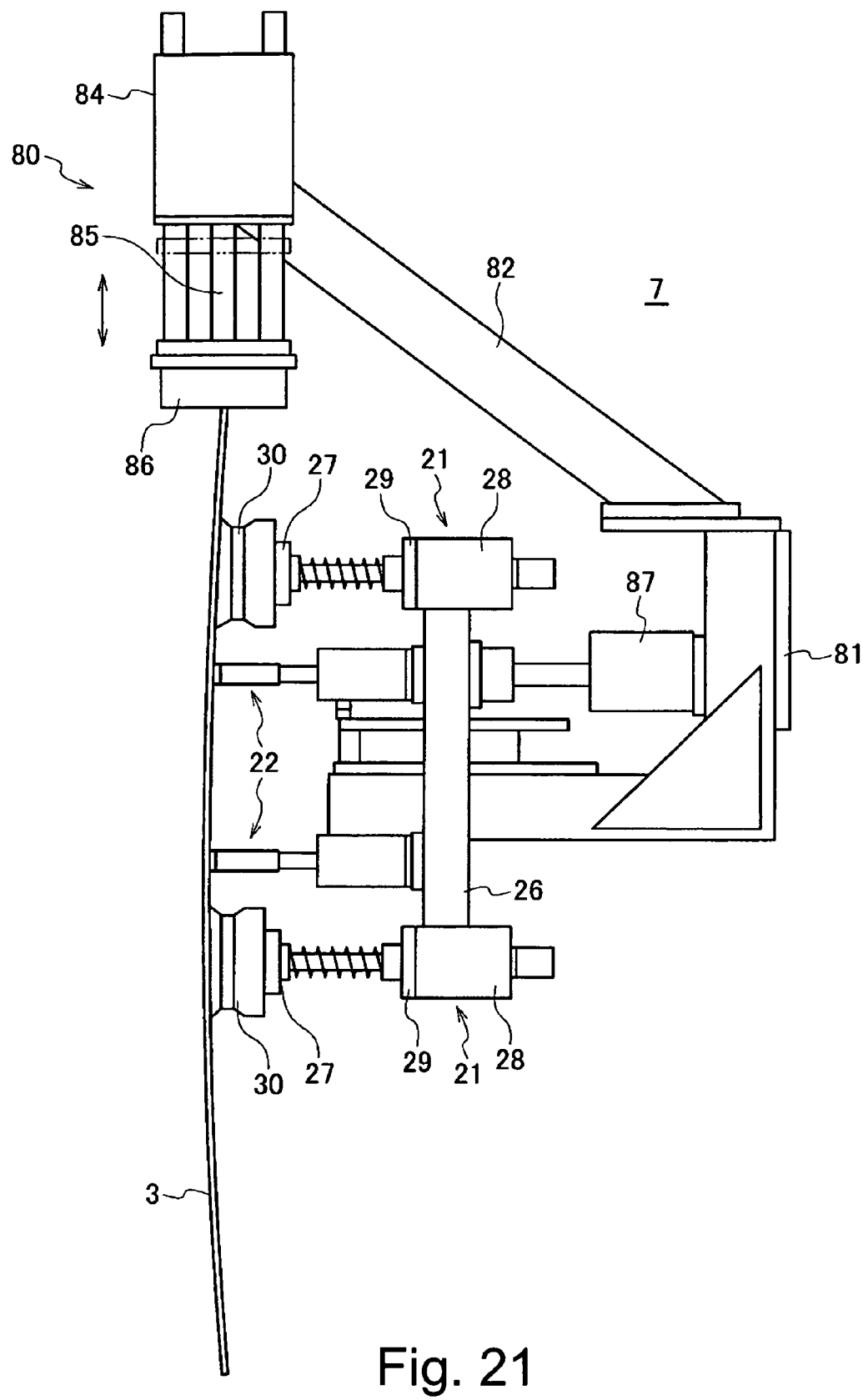
FIG. 21 is a simplified side elevational view of the glass transfer device illustrated in FIG. 19 that is equipped with the glass pressure unit in accordance with the illustrated embodiment of the present invention.

FIGS. 19 to 21 show an example in which two glass pressure units 80 are attached to the handling robot 2 in order to prevent the glass plates 3 from inclining towards the center of the pallet (glass arrangement direction) and preventing vacuum chucking from being performed when the glass plates 3 disposed on the first pallet 4 are handled by the vacuum-chuck pads 30.

The glass transport device 7 attached to the handling robot 2 in FIGS. 19, 20 and 21 is substantially the same as the embodiment described above, although the glass holding position adjustment unit 23 described above is not shown in order to simplify the description. It will be apparent from this disclosure that the glass holding position adjustment unit 23 is preferably provided in the same manner as described above.

The glass pressure units 80 are supported on a device attachment plate main body 81 that is fixed to the wrist 6 of the handling robot 2 by two arms 82 and a linkage arm 83. The glass pressure units 80 are fixed to each end of the linkage arm 83 that is attached to the tops of the two arms 82. The two arms 82 are fixed to the device attachment plate main body 81, which is itself fixed to the wrist 6 of the handling robot 2. The glass pressure units 80 have drive cylinders 84 that operate by air or oil and that are part of an upward and downward movement mechanism. The drive cylinders 84 have cylinder rods 85 with pads 86 that are formed from urethane or the like. The pads 86 are attached to the tops of the cylinder rods 85 of the drive cylinders 84. The glass pressure units 80 are configured so that the pads 86 advance and withdraw by the advancing and withdrawing operation of the cylinder rods 85 with respect to the top end 3e of a glass plate 3 that is placed upright on the first pallet 4.

The glass pressure unit 80 is disposed above the glass plate 3 that is placed upright on the first pallet 4. The drive cylinders 84 operate prior to the handling of the glass plate 3 by the vacuum-chuck pads 30 to cause the pads 86 to descend and to press against the upper end 3e of the glass plate 3. By this arrangement, the glass plate 3 is stabilized without inclination when the upper end 3e is pressed upon by the pads 86 while the lower end 3d is pressed upon by the glass placement grooves 10 on the first pallet 4 described above. At the point when the glass plate 3 is stably held, the glass plate 3 is handled by the vacuum-chuck pads 30 when the vacuum-chuck position adjustment units 21 approaches the glass plate 3 via a slide device 87 attached to the device removal plate main body 81. At this time, the glass plate 3 is pressed onto the first pallet 4 by the glass pressure unit 80, and thus the glass plate 3 is stably handled by the vacuum-chuck pads 30 without inclining in the depthwise direction of the plates.

In accordance with this embodiment, the glass pressure unit 80 is attached to the handling robot 2, so that when the glass plates 3 is to be handled by the vacuum-chuck position adjustment units 21 and taken out from the first pallet 4, the glass plates 3 can be stably held and reliably handled by vacuum chucking. Moreover, in accordance with this embodiment, it is not necessary to use a device for holding the glass plates 3 on each of the first pallets 4, thereby achieving a reduction in equipment costs.

Figure 22:
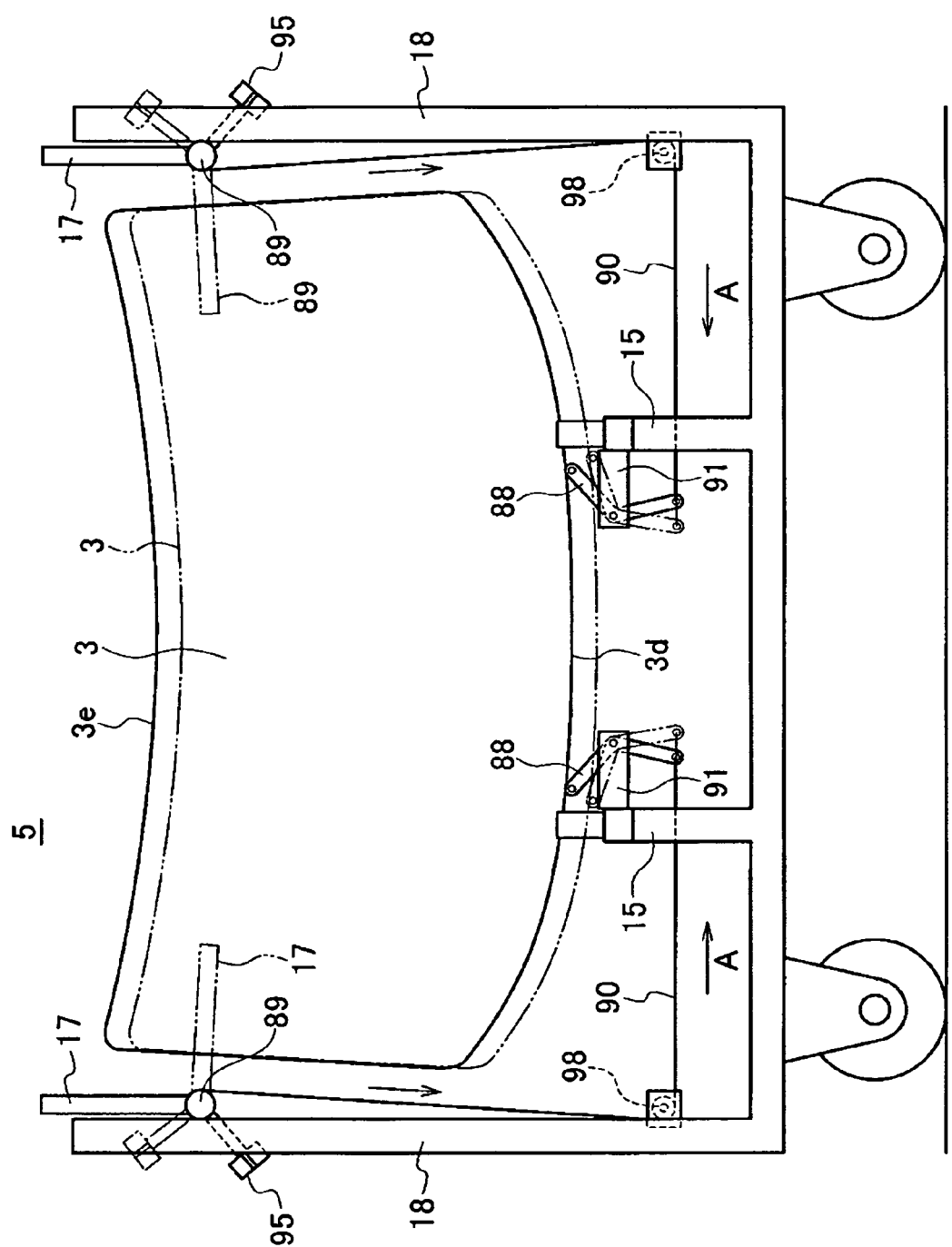
FIG. 22 is a simplified front elevational view of one of the second pallets equipped with a partitioning plate lowering unit for lowering the glass partitioning plates in conjunction with the weight of the glass.
Figure 23:
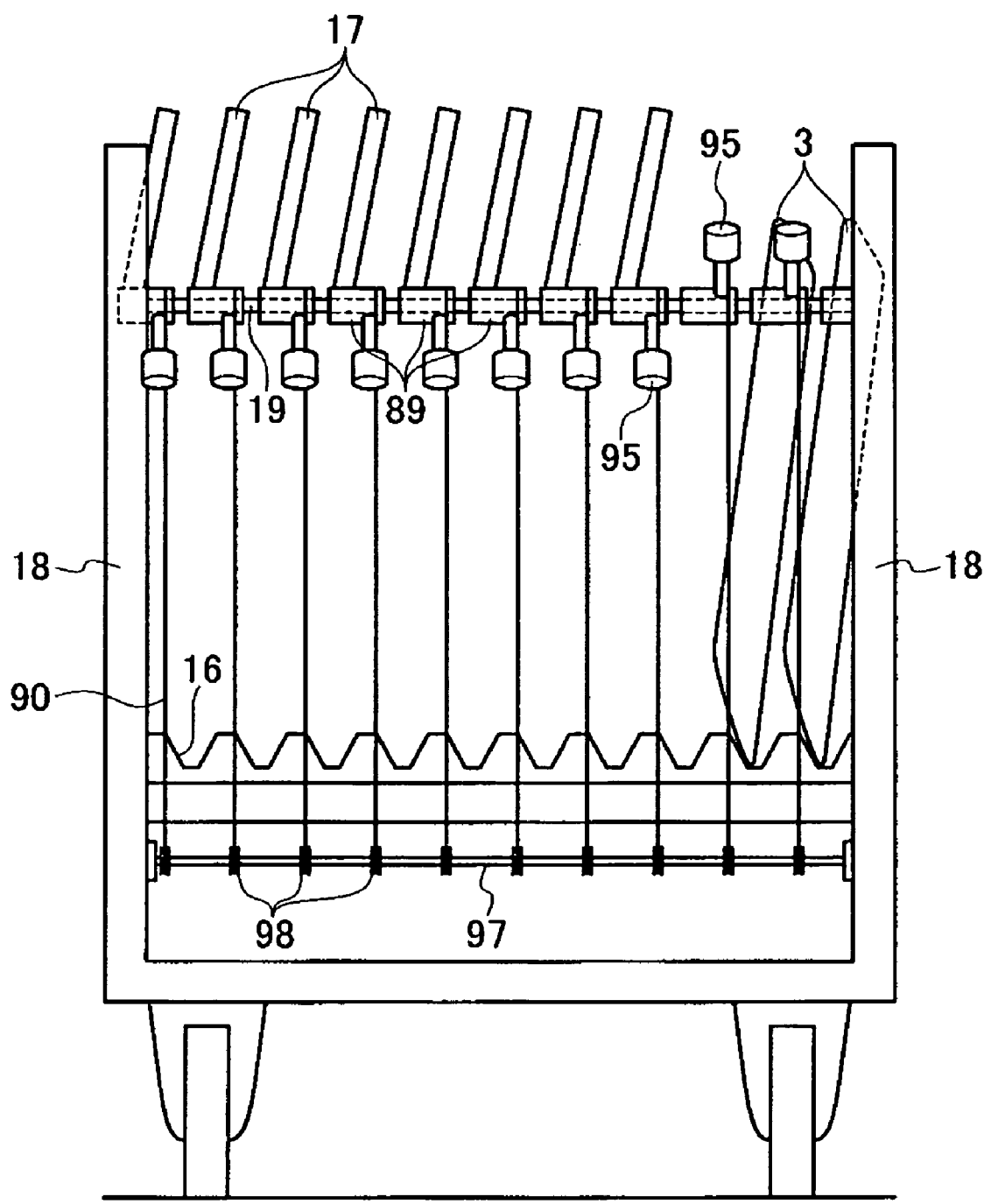
FIG. 23 is a simplified side elevational view of the second pallets illustrated in FIG. 22 that is equipped with the partitioning plate lowering unit for lowering the glass partitioning plates in conjunction with the weight of the glass.

FIGS. 22 and 23 show a case in which a partitioning plate lowering unit is provided on the second pallet 5 so that when the glass plates 3 that has been taken out from the first pallet 4 is to be inserted into the second pallet 5, the partitioning plate is automatically lowered in conjunction with the weight of the inserted glass plate. In the above embodiment, after insertion of the glass plate 3 into the second pallet 5, the glass partitioning plate 17 is lowered by the partitioning plate lowering unit 24 attached to the handling robot 2. In this embodiment, however, the weight of the glass plate 3 is utilized in order to lower the glass partitioning plates 17.

The partitioning plate lowering unit of this embodiment has a link plate 88 that rotates under the weight of a glass plate 3 when the glass plate 3 is inserted into the second pallet 5, and a wire 90 that has one end fixed to the link plate 88 and another end fixed to a rotating member 89 on which the glass partitioning plate 17 is fixed.

Figure 24:
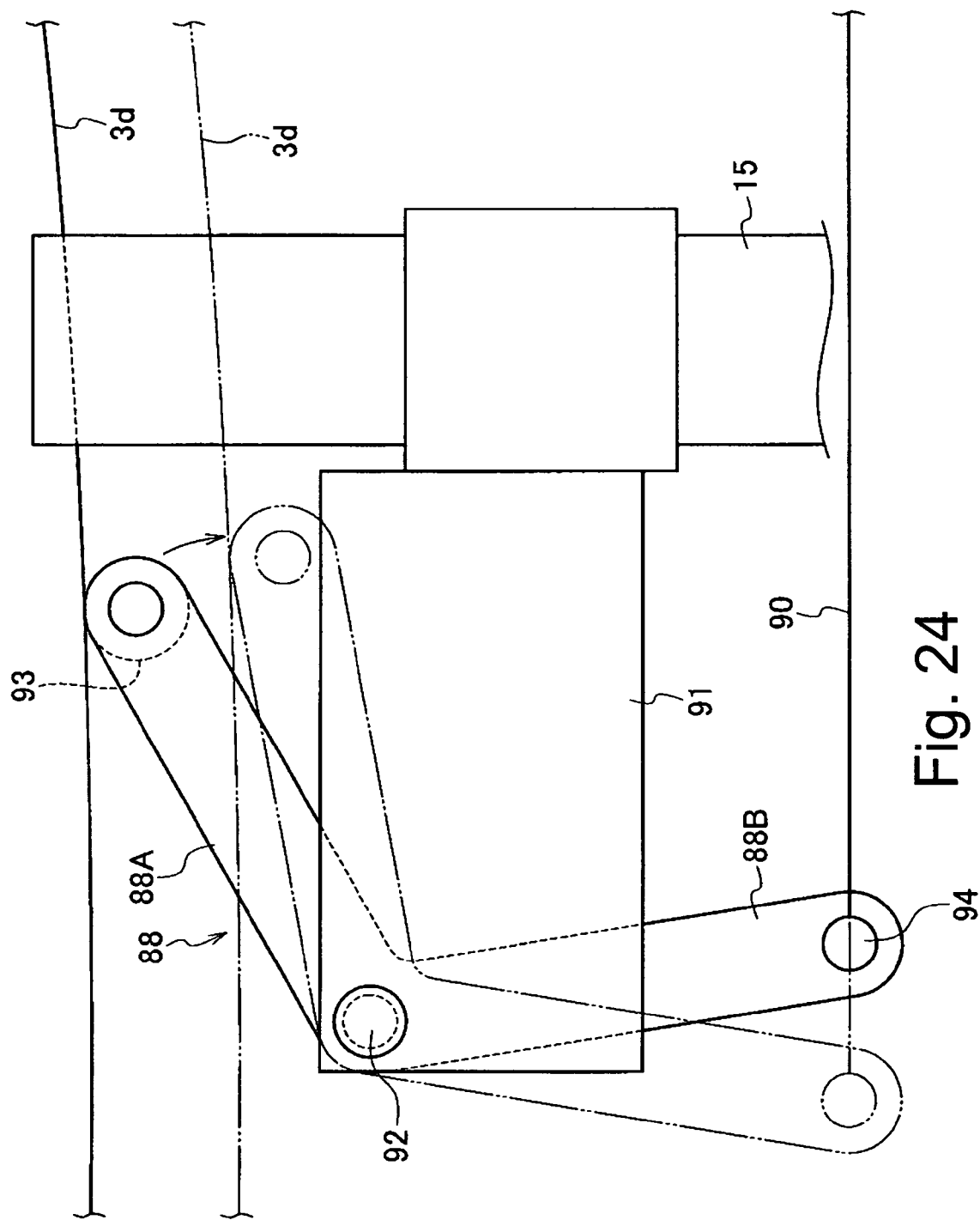
FIG. 24 is a simplified front elevational view of a link plate attachment part that constitutes the partitioning plate lowering unit shown in FIG. 22.
Figure 25:
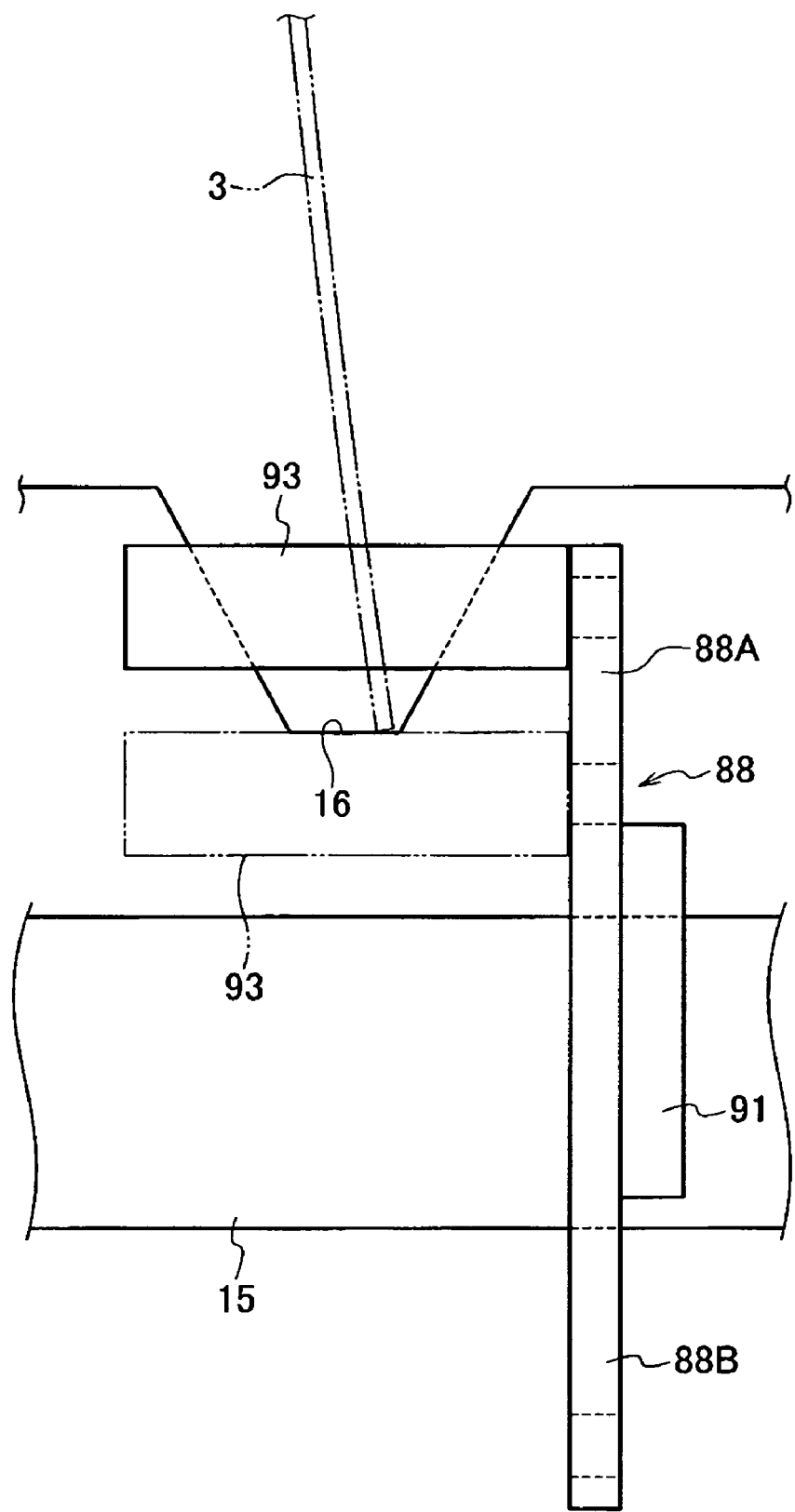
FIG. 25 is a simplified side elevational view showing the link plate attachment part that constitutes the partitioning plate lowering unit shown in FIG. 22.

As shown in FIGS. 24 and 25, the link plate 88 has a first arm 88A that extends in one direction, and a second arm 88B that extends in another direction so that a flat, substantially V-shaped overall shape is produced. The link plates 88 are rotatably attached and allowed to rotate around the vertex that produces this V shape. The plates 88 are attached to flanges 91 that are fixed to each of a pair of glass placement/support members 15, 15 provided on the bottom of the pallet. Specifically, the vertex of the link plate 88 is attached to a rotational support shaft 92 mounted on the flange 91, thereby allowing free rotation of the link plate 88 with respect to the flange 91.

The tip of the first arm 88A of the link plate 88 has a roll 93 that abuts immediately in front of the position in which the lower end 3d of the glass plate 3, which is inserted into the second pallet 5, enters the glass placement groove 16 having a substantially tabular cross-section. This roll 93 causes the link plate 88 to rotate by abutting the glass plate 3, and is attached to the first arm 88A so that it can either rotate or not rotate. A wire attachment hole 94 for fixing one end of the wire 90 is formed on the top of the second arm 88B.

The link plates 88 are provided in the number required for partitioning the glass plates 3 that are inserted and placed on the second pallet 5 in the lengthwise direction of the glass placement/support member 15.

Figure 26A:
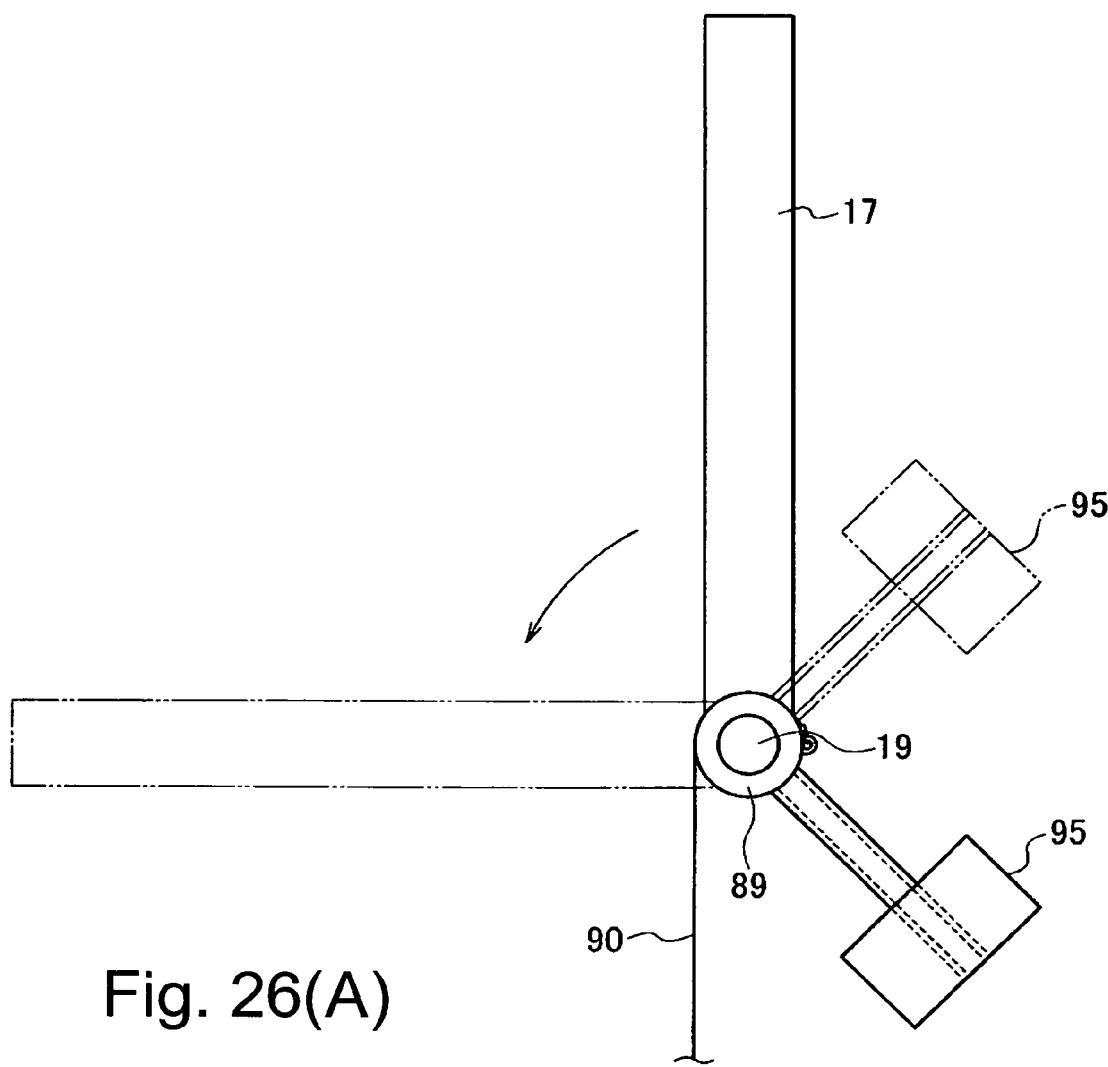
FIG. 26 is a simplified side elevational view showing a glass partitioning plate attachment part that constitutes the partitioning plate lowering unit shown in FIG. 22.
Figure 26B:
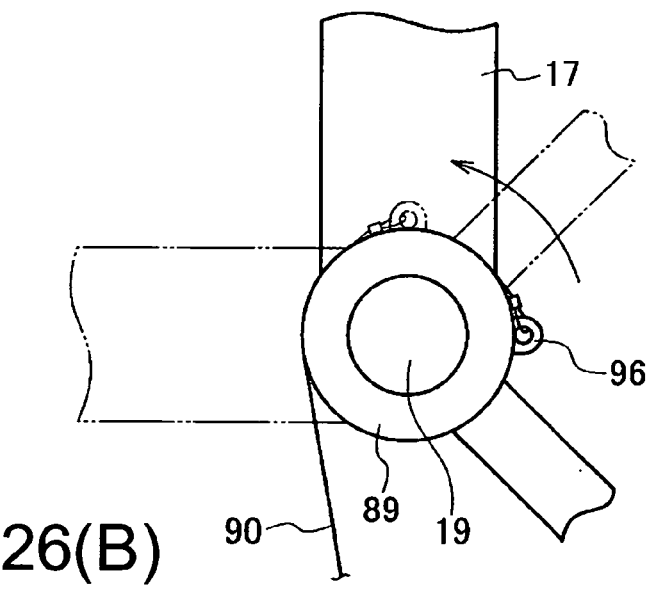
Figure 27:
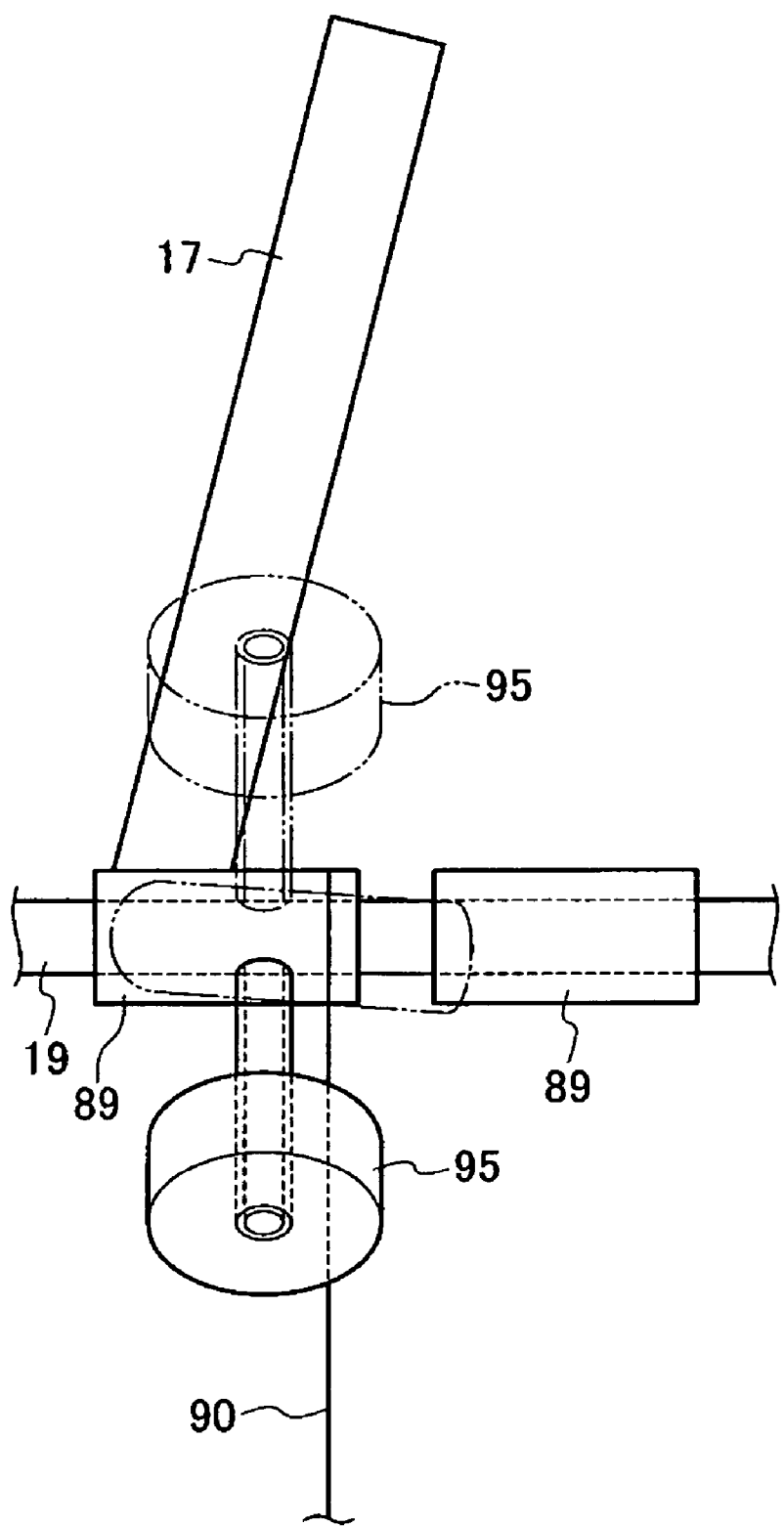
FIG. 27 is a simplified front elevational view showing the glass partitioning plate attachment part that constitutes the partitioning plate lowering means shown in FIG. 22.

As shown in FIGS. 26 and 27, the glass partitioning plates 17 are joined by welding or the like to the rotating members 89 that are rotatably attached to the support shaft 19. The support shaft 19 is fixed between the pallet support columns 18. The glass partitioning plates 17, as in the embodiment described above, aid in partitioning the glass plates 3 that have been inserted into the second pallet 5. Similarly, the partitioning plates are provided in the number required to partition the multiple glass plates 3 that are to be inserted into the second pallet 5. In addition to the glass partitioning plates 17, the rotating member 89 also has a weight 95 for balancing the weight on the side of the roll 93 via a wire 90.

The wire 90 is fixed by having one end fastened to the wire attachment hole 94 of the link plate 88, whereas the other end is fixedly fastened to a wire fixing part 96 provided on the rotating member 89. The wire 90 between the link plate 88 and rotating member 89 is also suspended on a relay roll 98 that is rotatably attached to a shaft 97 fixed to the base end between the support columns 18. The wire 90 has a substantially L-shaped configuration when viewed from an overall perspective. The relay roll 98 and the wire 90 are similarly provided in the exact number required for partitioning the multiple glass plates 3 that are to be inserted into the second pallet 5.

When the glass plate 3 is inserted into the second pallet 5 having the partitioning plate lowering unit configured in this manner, the bottom edge 3d of the glass plate 3 is guided into the glass placement groove 16. As this occurs, the roll 93 that is provided on the link plate 88 continues to drop downwards. When the glass plate 3 is introduced into the second pallet 5 and the weight is received by the roll 93, the link plate 88 rotates around the rotating support shaft 92, and the wire 90 is pulled in the direction indicated by the arrow A in FIG. 22. As a result, the wire 90 rotates the rotating member 89. The rotating member is rotatably attached to the support shaft 19 via the relay roll 98 that rotates with respect to the shaft 97. The glass partitioning plate 17 that is joined to the rotating member 89 is thus lowered in an approximately horizontal direction from its state before insertion of an upright glass plate, and the glass plate 3 that has been placed is thus supported on the glass placement groove 16.

In accordance with this embodiment, when glass plates 3 that are held in the glass transfer device 7 are placed on the second plate 5, the glass plates 3 are arranged at a prescribed spacing by the lowering of the glass partitioning plates 17 provided on the second pallet 5 in conjunction with the weight of the glass plates 3 on the pallet 5. Consequently, the dedicated partitioning plate lowering unit 24 used in the above embodiment is not necessary, equipment costs can be greatly decreased, and the device configuration can be simplified. In accordance with this embodiment, the above partitioning plate lowering unit 24 is not necessary, which also prevents the first pallet 4 and the partitioning plate lowering unit 24 from interfering with each other.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A workpiece transfer method comprising:
providing a first pallet containing a workpiece at a first location adjacent to a robot having a transfer device with a hand frame that is movably attached to the robot to pick up the workpiece;
transporting the workpiece from the first pallet using the transfer device to a positional adjustment part in response to pre-programmed operations of the robot;
performing a workpiece alignment operation to align a workpiece holding position in which the workpiece is held by the hand frame relative to the robot;
setting a prescribed distance corresponding approximately to a distance between an end of the workpiece to the positional adjustment part in an adjustment direction from the end of the workpiece to the positional adjustment part when the robot is positioned at an alignment operation starting position and the workpiece holding position is aligned with a reference holding position of the robot, the prescribed distance being larger than a displacement between the end of the workpiece to the positional adjustment part in the adjustment direction when the robot is positioned at the alignment operation starting position and the workpiece holding position is misaligned with the reference holding position; and moving the robot from the alignment operation starting position towards the positional adjustment part in the adjustment direction by the prescribed distance such that the end of the workpiece contacts the positional adjustment part thereby to move the hand frame relative to the robot in a direction opposite the adjustment direction by an amount of a difference between the prescribed distance and the displacement and to align the workpiece holding position with the reference holding position.

2. The workpiece transfer method according to claim 1, further comprising providing a second pallet configured to receive the workpiece from the transfer device of the robot; and placing the workpiece on the second pallet using the transfer device of the robot.

3. The workpiece transfer method according to claim 2, further comprising providing partitioning plates on the second pallet to support the workpiece at a prescribed spacing from an adjacent workpiece on the second pallet.

4. The workpiece transfer method according to claim 3, wherein the placing of the workpiece on the second pallet results in the weight of the workpiece operatively engaging at least one of the partitioning plates on the second pallet to be lowered from a non-spacing position to a spacing position in which the workpiece is supported at the prescribed spacing from the adjacent workpiece on the second pallet.

5. The workpiece transfer method according to claim 1, wherein the transporting of the workpiece from the first pallet involves applying downward pressure to the workpiece while on the first pallet by a workpiece pressure device attached to the robot, and then subsequently holding and removing the workpiece with the transfer device.

6. A workpiece transfer method comprising:

providing a first pallet containing a workpiece at a first location adjacent to a robot having a transfer device with a hand frame that is movably attached to the robot to pick up the workpiece;

transporting the workpiece from the first pallet using the transfer device to a positional adjustment part in response to pre-programmed operations of the robot;

performing a workpiece alignment operation to align a workpiece holding position in which the workpiece is held by the hand frame relative to the robot;

setting a prescribed distance corresponding approximately to a distance from an end of the workpiece to the positional adjustment part when the workpiece holding position is aligned with a reference holding position of the robot, the prescribed distance being larger than a displacement between the end of the workpiece to the positional adjustment part when the workpiece holding position is misaligned with the reference holding position; and moving the robot towards the positional adjustment part by the prescribed distance such that the end of the workpiece contacts the positional adjustment part thereby to move the hand frame relative to the robot and to align the workpiece holding position with the reference holding position, the providing of the first pallet containing the workpiece including providing the first pallet containing a sheet-form workpiece having a substantially rectangular shape; and the performing of the workpiece alignment operation including positioning the workpiece in a depthwise direction of the workpiece, a widthwise direction of the workpiece and a longitudinal direction of the workpiece by contacting the workpiece that is held by the transfer device with the positional adjustment part.

7. A workpiece transfer method comprising:

providing a first pallet containing a workpiece at a first location adjacent to a robot having a transfer device with a hand frame that is movably attached to the robot to pick up the workpiece, the workpiece including a sheet-form workpiece with a substantially rectangular shape with the workpiece having a pair of opposing linear edges and a pair of opposing curved edges;

transporting the workpiece from the first pallet using the transfer device to a positional adjustment part in response to pre-programmed operations of the robot;

performing a workpiece alignment operation to align a workpiece holding position in which the workpiece is held by the hand frame relative to the robot;

setting a prescribed distance corresponding approximately to a distance from an end of the workpiece to the positional adjustment part for a reference holding position of the robot; and moving the robot towards the positional adjustment part by the prescribed distance such that the end of the workpiece contacts the positional adjustment part thereby to move the hand frame relative to the robot and to align the workpiece holding position with the reference holding position, the performing of the workpiece alignment operation including positioning the workpiece in a depthwise direction of the workpiece, a widthwise direction of the workpiece and a longitudinal direction of the workpiece by contacting the workpiece that is held by the transfer device with the positional adjustment part, and the performing of the workpiece alignment operation further including first contacting one of the linear edges with the positional adjustment part and then contacting one of the curved edges with the positional adjustment part to align the workpiece holding position in which the workpiece is held by the transfer device with the reference holding position of the robot.

8. A workpiece transfer method comprising:

providing a first pallet containing a workpiece at a first location adjacent to a robot having a transfer device with a hand frame that is movably attached to the robot to pick up the workpiece;

transporting the workpiece from the first pallet using the transfer device to a positional adjustment part in response to pre-programmed operations of the robot;

performing a workpiece alignment operation to align a workpiece holding position in which the workpiece is held by the hand frame relative to the robot;

setting a prescribed distance corresponding approximately to a distance from an end of the workpiece to the positional adjustment part when the workpiece holding position is aligned with a reference holding position of the robot, the prescribed distance being larger than a displacement between the end of the workpiece to the positional adjustment part when the workpiece holding position is misaligned with the reference holding position; and moving the robot towards the positional adjustment part by the prescribed distance such that the end of the workpiece contacts the positional adjustment part thereby to move the hand frame relative to the robot and to align the workpiece holding position with the reference holding position, the performing of the workpiece alignment operation including first contacting one of opposing linear edges of the workpiece with the positional adjustment part and then contacting one of opposing curved edges of the workpiece with the positional adjustment part to align the workpiece holding position in which the workpiece is held by the transfer device with the reference holding position of the robot.

* * * * *